US011902069B2

(12) United States Patent
Matsumura et al.

(10) Patent No.: US 11,902,069 B2
(45) Date of Patent: Feb. 13, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Yuichi Kakishima, Palo Alto, CA (US); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 17/627,970

(22) PCT Filed: Aug. 2, 2019

(86) PCT No.: PCT/JP2019/030604
§ 371 (c)(1),
(2) Date: Jan. 18, 2022

(87) PCT Pub. No.: WO2021/024329
PCT Pub. Date: Feb. 11, 2021

(65) Prior Publication Data
US 2022/0278880 A1 Sep. 1, 2022

(51) Int. Cl.
*H04L 27/26* (2006.01)
*H04L 5/00* (2006.01)
*H04J 13/00* (2011.01)

(52) U.S. Cl.
CPC ........ *H04L 27/2613* (2013.01); *H04J 13/004* (2013.01); *H04L 5/0016* (2013.01); *H04L 5/0051* (2013.01)

(58) Field of Classification Search
CPC . H04L 27/2613; H04L 27/261; H04L 5/0016; H04L 5/0051; H04L 5/021;
(Continued)

(56) References Cited

U.S. PATENT DOCUMENTS

2012/0093120 A1* 4/2012 Ko .................. H04B 7/0671
370/329
2013/0195034 A1* 8/2013 Noh ................. H04W 72/0466
370/329
(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
(Continued)

*Primary Examiner* — Candal Elpenord
(74) *Attorney, Agent, or Firm* — Osha Bergman Watanabe & Burton LLP

(57) ABSTRACT

A terminal according to one aspect of the present disclosure includes: a control section that assumes that a frequency domain orthogonal cover code (FD-OCC) having a sequence length of a number larger than two is applied to a demodulation reference signal mapped to a pair of resource elements the number of which is greater than two and that are being different in frequency; and a transmitting/receiving section that performs transmission processing or reception processing of the demodulation reference signal, based on the FD-OCC. According to one aspect of the present disclosure, even when there are terminals according to different releases, each of the terminals can appropriately perform communication.

10 Claims, 22 Drawing Sheets

(58) Field of Classification Search
CPC ...... H04J 13/004; H04J 13/0003; H04J 13/16; H04J 2211/005; H04W 16/28; H04W 72/04
USPC .................................................. 370/329–330
See application file for complete search history.

(56) References Cited

U.S. PATENT DOCUMENTS

| | | | |
|---|---|---|---|
| 2020/0127786 A1* | 4/2020 | Kwak | H04L 5/0051 |
| 2022/0239400 A1* | 7/2022 | Bhamri | H04J 13/102 |
| 2023/0155759 A9* | 5/2023 | Ren | H04L 27/26035 370/330 |

OTHER PUBLICATIONS

3GPP TSG RAN WG1#97 Meeting; R1-1907211 "UL signals and channels for NR-U" Sharp; Reno, USA; May 13-17, 2019 (9 pages).
3GPP TSG-RAN WG1 Meeting #96; R1-1903012 "Lower PAPR reference signals" Qualcomm Incorporated; Athens, Greece; Feb. 25-Mar. 1, 2019 (20 pages).
International Search Report issued in International Application No. PCT/JP2019/030604, dated Mar. 10, 2020 (3 pages).
Written Opinion issued in International Application No. PCT/JP2019/030604; dated Mar. 10, 2020 (3 pages).

* cited by examiner

Table 7.4.1.1.2-1: Parameters for PDSCH DM-RS configuration type 1.

Freq. domain OCC

ALSO APPLIED TO Single symbol DMRS AS WELL (ORTHOGONALIZATION WITH FDM AND freq. domain OCC)

Table 7.4.1.1.2-2: Parameters for PDSCH DM-RS configuration type 2.

APPLIED TO Double symbol DMRS (ORTHOGONALIZATION WITH time domain OCC)

FIG. 4

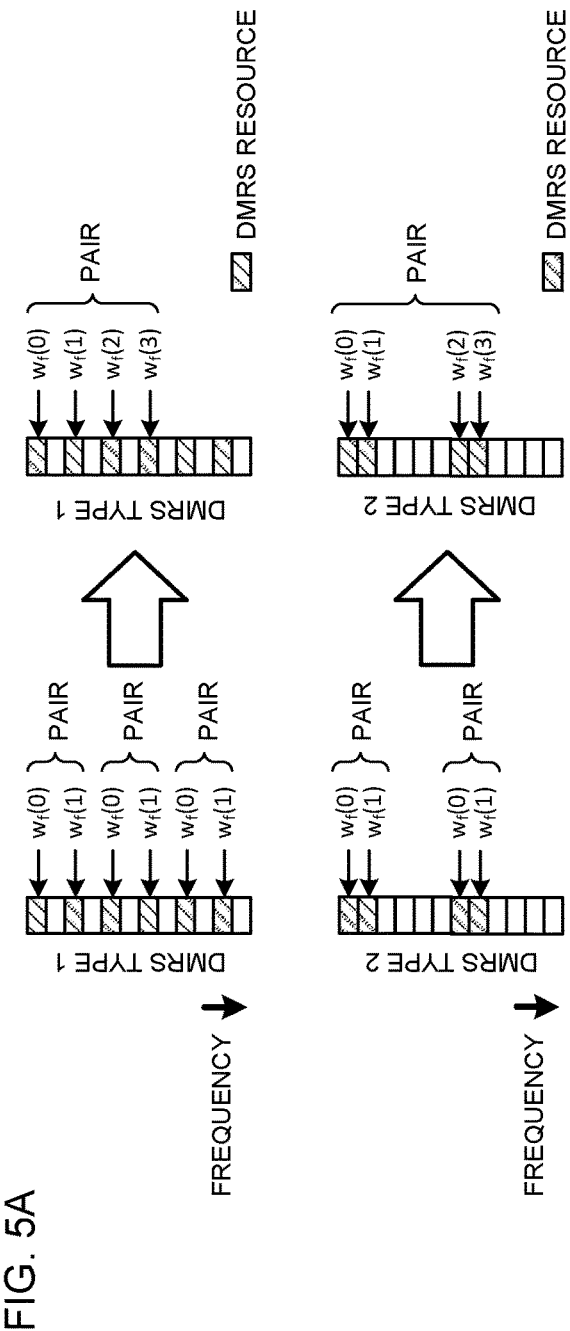

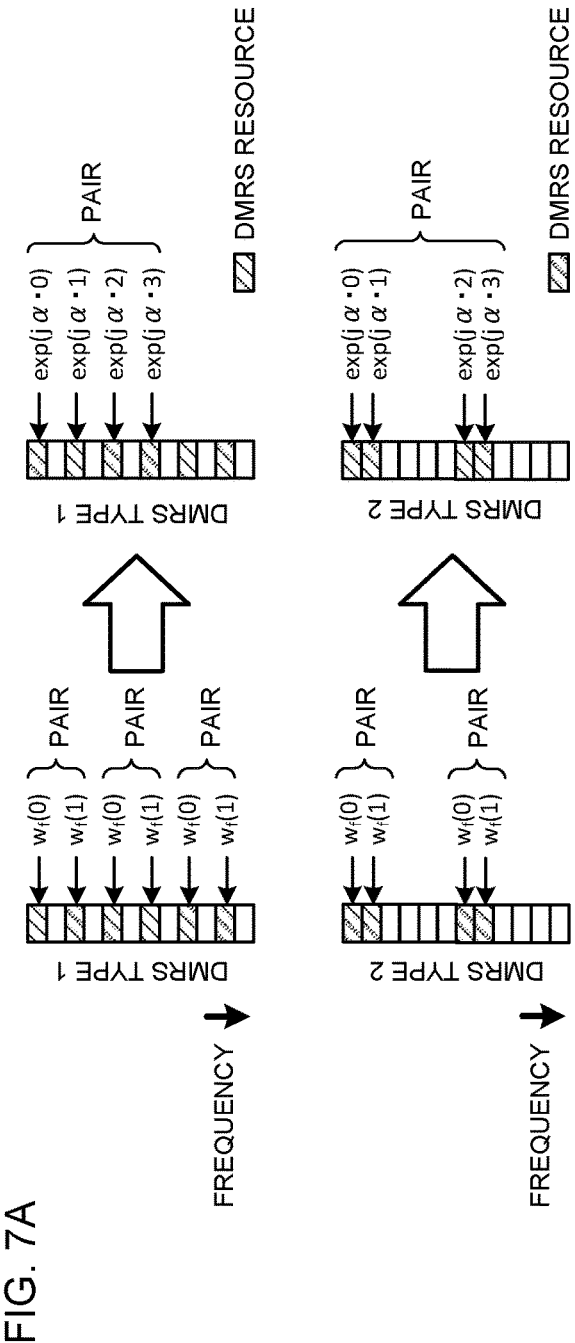

FIG. 14A

EXAMPLE OF Time domain OCC (SEQUENCE LENGTH = 2)

| p | $w_t(0)$ | $w_t(1)$ |
|---|---|---|
| m | +1 | +1 |
| m+1 | +1 | -1 |

FIG. 14B

EXAMPLE OF Time domain OCC (SEQUENCE LENGTH = 3)

| p | $w_t(0)$ | $w_t(1)$ | $w_t(2)$ |
|---|---|---|---|
| m | $\exp(j0\cdot 0)$ | $\exp(j0\cdot 1)$ | $\exp(j0\cdot 2)$ |
| m+1 | $\exp(j(2\pi/3)\cdot 0)$ | $\exp(j(2\pi/3)\cdot 1)$ | $\exp(j(2\pi/3)\cdot 2)$ |
| m+2 | $\exp(j(4\pi/3)\cdot 0)$ | $\exp(j(4\pi/3)\cdot 1)$ | $\exp(j(4\pi/3)\cdot 2)$ |

FIG. 14C

EXAMPLE OF Time domain OCC (SEQUENCE LENGTH = 4)

| p | $w_t(0)$ | $w_t(1)$ | $w_t(2)$ | $w_t(3)$ |
|---|---|---|---|---|
| m | +1 | +1 | +1 | +1 |
| m+1 | +1 | +j | -1 | -j |
| m+2 | +1 | -1 | +1 | -1 |
| m+3 | +1 | -j | -1 | +j |

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a method of beam management is introduced. For example, for NR, forming (or using) beams in at least one of a base station and a user terminal (User Equipment (UE)) has been under study.

The beam is roughly categorized into a digital beam (digital precoding), whereby a plurality of beams can be simultaneously formed, and an analog beam (analog precoding), whereby up to one beam can be simultaneously formed.

It is assumed that, in future radio communication systems (for example, NR of Rel-17 or later versions), even in a high frequency, operation of only the digital beam without the use of the analog beam (which may be referred to as full digital operation) is used and operation implementing dominant use of the digital beam are used.

Even if the base station adopts full digital, the UE according to Rel-15 ought to be supported as far as the UE according to Rel-15 is present.

At the same time, for the sake of orthogonalization of layers or the like, a reference signal (for example, a demodulation reference signal (DMRS)) having a plurality of ports is used. In future NR, the number of DMRS ports is required to be increased from that of Rel. 15. However, in such a case, how to accommodate the UE according to Rel. 15 and the UE according to later releases (for example, the UE according to Rel. 16, the UE according to Rel. 17, or the like), how to subject the DMRS ports to orthogonalization, and the like have not yet been fully studied.

If the number of DMRS ports cannot be increased or the DMRS between the UEs cannot be appropriately subjected to orthogonalization, increase of communication throughput may be prevented.

In the light of this, the present disclosure has an object to provide a terminal and a radio communication method that enable, even when there are terminals according to different releases, each of the terminals to appropriately perform communication.

Solution to Problem

A terminal according to one aspect of the present disclosure includes: a control section that assumes that a frequency domain orthogonal cover code (FD-OCC) having a sequence length of a number larger than two is applied to a demodulation reference signal mapped to a pair of resource elements the number of which is greater than two and that are being different in frequency; and a transmitting/receiving section that performs transmission processing or reception processing of the demodulation reference signal, based on the FD-OCC.

Advantageous Effects of Invention

According to one aspect of the present disclosure, even when there are terminals according to different releases, each of the terminals can appropriately perform communication.

BRIEF DESCRIPTION OF DRAWINGS

FIG. 4 is a diagram to show an example of parameters applied to a PDSCH DMRS according to Rel. 15 NR;

FIGS. 5A and 5B are each a diagram to show an example of an FD-OCC according to a first embodiment;

FIGS. 7A and 7B are each a diagram to show an example of the FD-OCC according to the first embodiment;

FIGS. 14A to 14C are each a diagram to show an example of $w_f(l')$ applied to the DMRS according to the second embodiment;

DESCRIPTION OF EMBODIMENTS (Beam Management)

In NR, a method of beam management is introduced. For example, for NR, forming (or using) beams in at least one of a base station and a UE has been under study.

Through application of beam forming (BF), it is expected that difficulty in securing coverage due to increase in carrier frequency be reduced, and radio wave propagation loss be reduced.

BF is, for example, a technique in which a beam (antenna directivity) is formed by controlling (also referred to as precoding) amplitude/phase of a signal that is transmitted or received from each element by using an ultra multi-element antenna. Note that Multiple Input Multiple Output (MIMO) using such an ultra multi-element antenna is also referred to as massive MIMO.

Figures 1A, 1B:
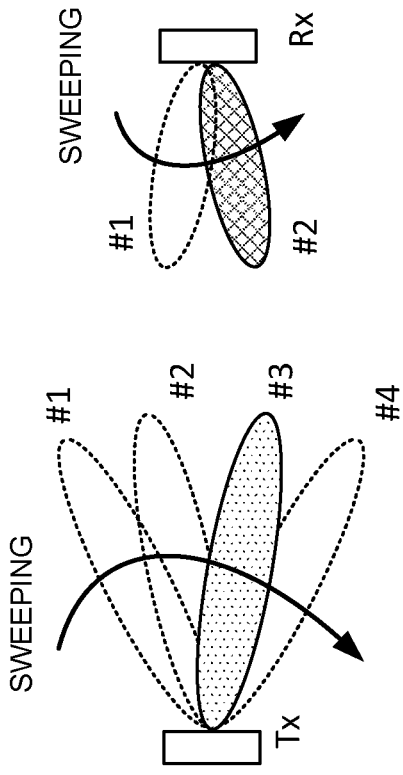
FIGS. 1A and 1B are each a diagram to show an example of a transmission and reception configuration in which beam management is used.

FIGS. 1A and 1B are each a diagram to show an example of a transmission and reception configuration in which beam management is used. The present example assumes a system in which a transmitter (Tx) side can form four beams (transmit beams #1 to #4), and a receiver (Rx) side can form two beams (receive beams #1 to #2).

In such a system, it is preferable that, as shown in FIG. 1A, sweeping of beams be performed in both of transmission and reception, and control be performed so that an appropriate pair is selected out of candidates of a total of eight patterns of transmit and receive beam pairs shown in FIG. 1B.

The pair of the transmit beam and the receive beam may be referred to as a beam pair, and for example, transmit beam #3 and receive beam #2 as shown in FIG. 1A may be identified as a beam pair candidate index=6 of FIG. 1B.

Note that, in beam management, a single beam is not used, and a plurality of levels of beam control, such as a rough beam and a fine beam, may be performed.

BF can be categorized into digital BF and analog BF. Digital BF and analog BF may be referred to as digital precoding and analog precoding, respectively.

Digital BF is, for example, a method in which precoding signal processing is performed on a baseband (for a digital signal). In this case, as many parallel processings, such as inverse fast Fourier transform (IFFT), digital to analog conversion (Digital to Analog Converter (DAC)), and Radio Frequency (RF), as the number of antenna ports (or RF chains) are required. At the same time, as many beams as the number of RF chains can be formed at any timing.

Analog BF is, for example, a method in which a phase shifter is used in RF. In analog BF, a plurality of beams cannot be formed at the same timing; however, a configuration thereof is easy and can be implemented at a low cost because it is only necessary that phase of RF signals be rotated.

Note that a hybrid BF configuration, which is a combination of digital BF and analog BF, can be implemented as well. In NR, introduction of massive MIMO has been under study. When forming of a great number of beams is intended to be performed by means of only digital BF, however, a circuit configuration costs much. Thus, use of the hybrid BF configuration is also assumed.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (which may be referred to as a signal/channel; hereinafter, in a similar manner, "A/B" may be interpreted as "at least one of A and B") based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information (SRI), or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A: Doppler shift, Doppler spread, average delay, and delay spread
QCL type B: Doppler shift and Doppler spread
QCL type C: Doppler shift and Average delay
QCL type D: Spatial reception parameter Types A to C may correspond to QCL information related to synchronization processing of at least one of time and frequency, and type D may correspond to QCL information related to beam control.

A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

(Development of MIMO Technology and Beam)

Incidentally, the MIMO technology has hitherto been used in a frequency bandwidth (or a frequency band) lower than 6 GHz. However, application even to a frequency band higher than 6 GHz in future has been under study.

Note that the frequency band lower than 6 GHz may be referred to as sub-6, frequency range (FR) 1, or the like. The frequency band higher than 6 GHz may be referred to as above-6, FR 2, a millimeter wave (mmW), FR 4, or the like.

Figure 2:
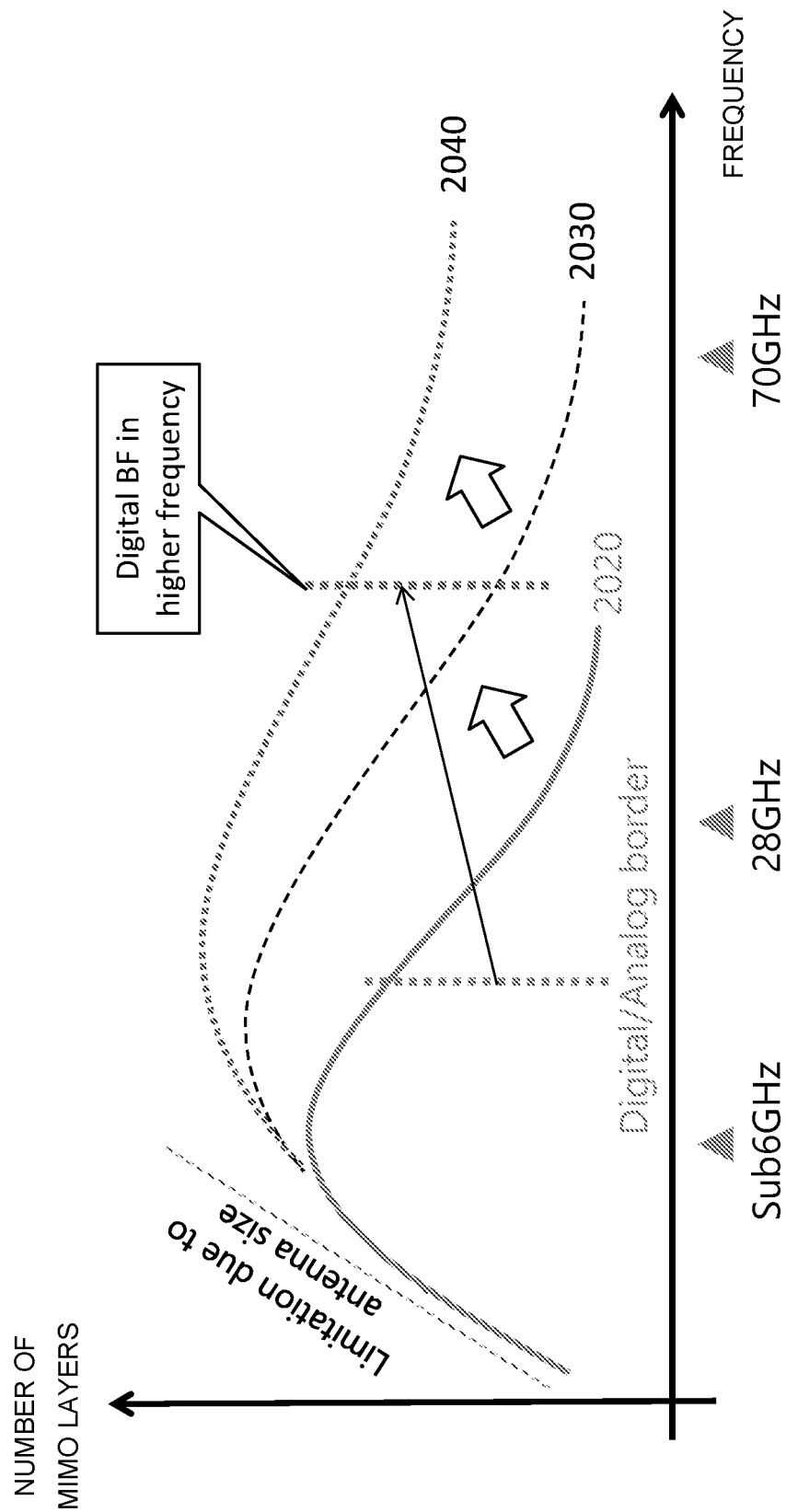
FIG. 2 is a diagram to show prediction of development of MIMO technology.

FIG. 2 is a diagram to show prediction of development of the MIMO technology. FIG. 2 shows an example in which how many MIMO layers can be implemented in each frequency in each decade (for example, 2020s, 2030s, and 2040s), with the horizontal axis representing frequency and the vertical axis representing the number of MIMO layers. It is assumed that the maximum number of MIMO layers is limited by an antenna size.

For example, the line of 2020s shows that the number of layers is the largest in a frequency band of around sub-6 GHz, and the number of layers is considerably small in a high frequency band such as 28 GHz. There is an application boundary of digital precoding and analog precoding around the middle of these frequency bands. In this decade, it is assumed that communication of sub-6 GHz can be implemented by using digital precoding, but communication around 28 GHz cannot be implemented. Note that analog precoding may be able to be applied regardless of the frequency band.

In around 2030s, it is assumed that, through adaptation of an advanced technique such as nonlinear precoding, the number of MIMO layers is generally increased, and in addition, precoding can be applied even in a higher frequency band. Thus, it is expected a line obtained by extending the line of 2020s in the upper right direction of the figure is the line of 2030s.

It is expected that the line of 2040s is a line obtained by extending the line of 2030s further in the upper right direction of the figure. In this decade, it is expected that communication of sub-6 GHz can be implemented by using digital precoding even in a frequency band higher than 28 GHz. It is assumed that the application boundary of digital precoding is shifted to a frequency band by far higher than that of 2020s.

It is expected that, even with mmW, through the use of MIMO of a higher order as well as cooperation of a plurality of UEs, the degree of freedom and diversity of MIMO multiplexing are enhanced, which further leads to enhancement of throughput.

In this manner, it is assumed that, in future radio communication systems (for example, NR of Rel-17 or later versions), even in a high frequency (for example, FR 2), operation of only the digital beam without the use of the analog beam (which may be referred to as full digital operation) is used and operation implementing dominant use of the digital beam are used.

For example, in a case of the full digital operation, by simultaneously applying orthogonal precoding (or an orthogonal beam, a digital beam) to a plurality of UEs, improvement of spectral efficiency can be expected. When the digital beam cannot be appropriately applied, interference between the UEs is increased, which leads to deterioration of communication quality (or reduction of cell capacity). Note that orthogonality according to the present disclosure may be interpreted as semi-orthogonality.

Figure 3A:
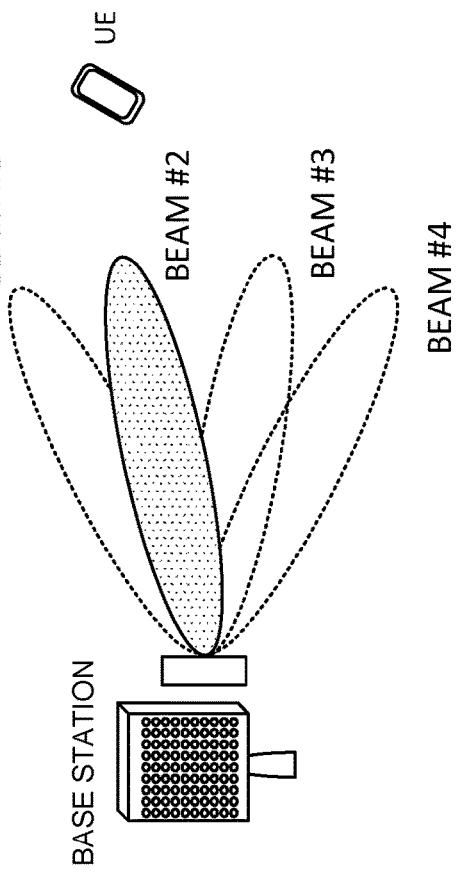
FIGS. 3A and 3B are each a diagram to show an example of operation of beams.
Figure 3B:
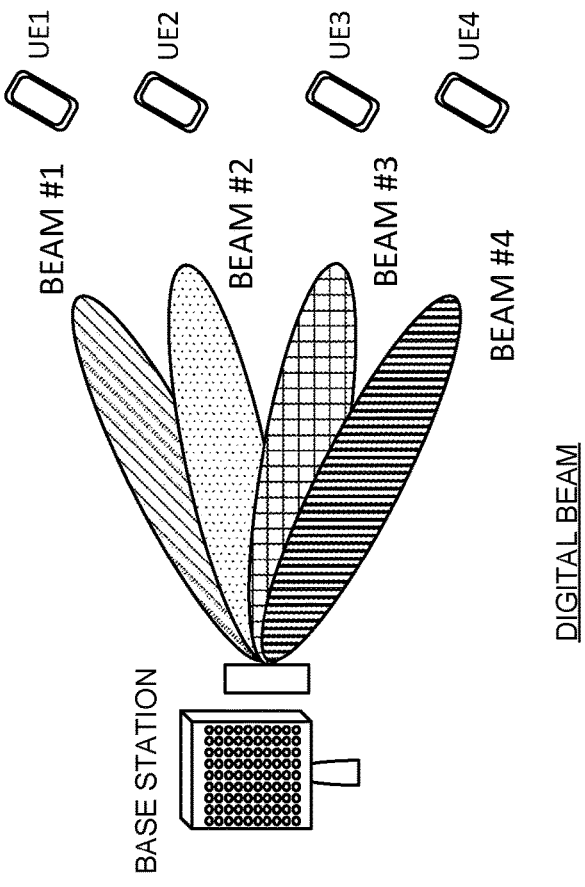

FIGS. 3A and 3B are each a diagram to show an example of operation of beams. In the present example, FR 2 is assumed.

However, the frequency range of the present disclosure is not limited to this. FIG. 3A shows an operation of the analog beams that are also used in Rel-15, and FIG. 3B shows an operation of the digital beams that are used in Rel-17 or later versions.

In FIG. 3A, the base station (which may be interpreted as a transmission/reception point (TRP), a panel, or the like) can only transmit one beam (beam #2 in FIG. 3A) at given time. Thus, the base station performs transmission and reception by switching beams for the UE.

In FIG. 3B, the base station can transmit a plurality of beams (beams #1 to #4 in FIG. 3B) at given time. Thus, the base station can perform transmission and reception to and from a plurality of UEs by using different beams simultaneously.

Even if the base station adopts full digital, the UE according to Rel-15 is desired to be supported as far as the UE according to Rel-15 is present.

(Ports of Reference Signals)

For the sake of orthogonalization of the MIMO layers or the like, reference signals (for example, a demodulation reference signal (DMRS) or a CSI-RS) having a plurality of ports are used.

For example, regarding single user MIMO (SU-MIMO), a different DMRS port/CSI-RS port may be configured for each layer. Regarding multi user MIMO (MU-MIMO), a different DMRS port/CSI-RS port may be configured for each layer in one UE and for each UE.

Note that, when the number of CSI-RS ports having a value larger than the number of layers used for data is used, it is expected that more accurate channel state measurement can be performed based on the CSI-RS, which contributes to improvement of throughput.

In Rel-15 NR, regarding the DMRS having a plurality of ports, through the use of frequency division multiplexing (FDM), a frequency domain orthogonal cover code (FD-OCC), a time domain OCC (TD-OCC), or the like, a maximum of eight ports are supported for a type 1 DMRS (in other words, DMRS configuration type 1), and a maximum of 12 ports are supported for a type 2 DMRS (in other words, DMRS configuration type 2).

In Rel-15 NR, as the FDM mentioned above, a pattern of transmission frequency having a shape of teeth of a comb (comb-like resource set) is used. As the FD-OCC mentioned above, a cyclic shift (CS) is used. The TD-OCC mentioned above can only be applied to a double symbol DMRS.

The OCC according to the present disclosure may be interchangeably interpreted as an orthogonal code, orthogonalization, a cyclic shift, or the like.

Note that the type of the DMRS may be referred to as a DMRS configuration type.

Among the DMRS, the DMRS that is subjected to resource mapping in the unit of contiguous (adjacent) two symbols may be referred to as a double symbol DMRS, and the DMRS that is subjected to resource mapping in the unit of one symbol may be referred to as a single symbol DMRS.

Both of the DMRSs may be mapped to one or more symbols per slot according to the length of a data channel. The DMRS that is mapped to a start position of a data symbol may be referred to as a front-loaded DMRS, and the DMRS that is additionally mapped to a position other than the start position may be referred to as an additional DMRS.

In a case of DMRS configuration type 1 and the single symbol DMRS, the Comb and the CS may be used for orthogonalization. For example, up to 4 antenna ports (APs) may be supported by using two types of Combs and two types of CSs (Comb2+2CS).

In a case of DMRS configuration type 1 and the double symbol DMRS, the Comb, the CS, and the TD-OCC may be used for orthogonalization. For example, up to eight APs may be supported by using two types of Combs, two types of CSs, and TD-OCCs ($\{1, 1\}$ and $\{1, -1\}$).

In a case of DMRS configuration type 2 and the single symbol DMRS, the FD-OCC may be used for orthogonalization. For example, up to six APs may be supported by applying the orthogonal code (2-FD-OCC) to two resource elements (REs) adjacent to each other in the frequency direction.

In a case of DMRS configuration type 2 and the double symbol DMRS, the FD-OCC and the TD-OCC may be used for orthogonalization. For example, up to 12 APs may be supported by applying the orthogonal code (2-FD-OCC) to two REs adjacent in the frequency direction and applying the TD-OCC ($\{1, 1\}$ and $\{1, -1\}$) to two REs adjacent in the time direction.

In Rel-15 NR, regarding the CSI-RS having a plurality of ports, through the use of FDM, time division multiplexing (TDM), a frequency domain OCC, a time domain OCC, or the like, a maximum of 32 ports are supported. Regarding orthogonalization of the CSI-RS as well, a method similar to that for the DMRS described above may be applied.

Incidentally, a group of DMRS ports subjected to orthogonalization by means of the FD-OCC/TD-OCC as described above is also referred to as a code division multiplexing (CDM) group.

Different CDM groups are subjected to FDM, and are thus orthogonal to each other. In contrast, in the same CDM group, orthogonality of the applied OCC may be collapsed due to channel change or the like. In this case, when signals in the same CDM group are received with different received powers, the near-far problem is caused, which may lead to a failure in securing orthogonality.

In view of this, it is desirable that different DMRS ports be applied to the UEs. In order to achieve this, the number of DMRS ports is required to be increased from that of Rel. 15. However, in such a case, how to accommodate the UE according to Rel. 15 and the UE according to later releases (for example, the UE according to Rel. 16, the UE according to Rel. 17, or the like), how to subject the DMRS ports to orthogonalization, and the like have not yet been fully studied. For example, in FIG. 3B, if UE 1 is a Rel-15 UE and UEs 2 to 4 are each a Rel-17 UE, based on which assumption each of the UEs performs processing is not made clear in present specifications.

If the number of DMRS ports cannot be increased or the DMRS between the UEs cannot be appropriately subjected to orthogonalization, increase of communication throughput may be prevented.

In the light of this, the inventors of the present invention came up with the idea of a method for increasing the number of DMRS ports in comparison to that of Rel. 15 NR and appropriately subjecting the DMRS between the UEs to orthogonalization.

Embodiments according to the present disclosure will be described below in detail with reference to the drawings. A radio communication method according to each embodiment may be applied individually, or may be applied in combination.

Note that "release" according to the present disclosure may mean release of 3GPP specifications.

The following embodiments can be applied to both of the downlink and the uplink. The following embodiments give description by taking the DMRS for the PDSCH as an example of the DMRS, but this is not restrictive. The DMRS according to the present disclosure may be interpreted as at least one of the DMRS for the PUSCH, the DMRS for the PDCCH, the DMRS for the PUCCH, the DMRS for another channel, and the like. When the interpretation is employed, the "PDSCH" may be interpreted as a channel (the PUSCH, the PDCCH, the PUCCH, or the like) that corresponds to each of the DMRSs.

In the present disclosure, the following description is given based on the assumption that a "UE according to an old release" means a UE according to Rel. 15 NR and a "UE according to a new release" means a UE according to NR of later than Rel. 15 (for example, a UE according to Rel. 16 or a UE according to Rel. 17). However, this is not restrictive.

For example, the "UE according to an old release" may mean a UE whose maximum or configurable number of ports (for example, the number of ports of the CSI-RS, the number of ports of the SRS, or the number of ports of the DMRS for at least one of the PUSCH, the PDSCH, the PDCCH, and the PUCCH) of a specific reference signal is a given number or less, and the "UE according to a new release" may mean a UE whose number of ports of the specific reference signal is larger than that of the "UE according to an old release". The "UE according to a new release" may mean a UE having capability different from that of the "UE according to an old release".

When there is a description of the term "UE" by itself, the "UE" may be interpreted as at least one of the "UE according to an old release" and the "UE according to a new release".

(Radio Communication Method)

In one embodiment according to the present disclosure, the UE according to a new release may assume that the TD-OCC/FD-OCC that is orthogonal to the TD-OCC/FD-OCC of the DMRS according to Rel. 15 and that is not used in Rel. 15 NR is applied to the DMRS.

In this case, the DMRS of the Rel. 15 UE and the DMRS of the UE according to a new release can be multiplexed on the same resource so as to cause the DMRSs to be orthogonal to each other. Note that data (a data symbol, a data resource, for example, a data symbol of the PDSCH) may be subjected to orthogonalization (for example, separation of layers) by using a beam/precoder.

First, the TD-OCC/FD-OCC of the DMRS according to Rel. 15 NR will be described. The DMRS mapped to the resource element (RE) may correspond to a sequence obtained by multiplying the TD-OCC on a DMRS sequence by a parameter (which may be referred to as a sequence element or the like) $w_f(k')$ of the FD-OCC and a parameter (which may be referred to as a sequence element or the like) $w_t(l')$.

The TD-OCC and the FD-OCC of the DMRS according to Rel. 15 NR both correspond to the OCC having a sequence length (which may be referred to as an OCC length) of 2. Thus, a possible value of each of k' and l' in the above is 0 or 1. By multiplying the FD-OCC in the unit of the RE, the DMRS having two ports can be multiplexed by using the same time and frequency resources (two REs). When both of the FD-OCC and the TD-OCC are applied, the DMRS having four ports can be multiplexed by using the same time and frequency resources (four REs).

FIG. 4 is a diagram to show an example of parameters applied to the PDSCH DMRS according to Rel. 15 NR. These tables are Tables 7.4.1.1.2-1 and 7.4.1.1.2-2 shown in 3GPP TS 38.211 § 7.4.1.1.2, and correspond to DMRS configuration type 1 and type 2, respectively. Note that p represents a number of the antenna port, and $\Delta$ represents a parameter for shifting (offsetting) the frequency resource.

For example, to antenna ports 1000 and 1001, $\{w_f(0), w_f(1)\}=\{+1, +1\}$ and $\{w_f(0), w_f(1)\}=\{+1, -1\}$ are respectively applied, so as to be subjected to orthogonalization by using the FD-OCC.

To each of antenna ports 1000 and 1001 and antenna ports 1002 and 1003 (in a case of type 2, antenna ports 1004 to 1005 as well), $\Delta$ of a different value is applied, so that FDM is applied. Thus, antenna ports 1000 to 1003 (or 1000 to 1005) corresponding to the single symbol DMRS are subjected to orthogonalization by using the FD-OCC and FDM.

To antenna ports 1000 to 1003 and antenna ports 1004 to 1007 of type 1, $\{w_t(0), w_t(1)\}=\{+1, +1\}$ and $\{w_t(0), w_t(1)\}=\{+1, -1\}$ are respectively applied, so as to be subjected to orthogonalization by using the TD-OCC. Thus, antenna ports 1000 to 1007 (or 1000 to 1011) corresponding to the double symbol DMRS are subjected to orthogonalization by using the FD-OCC, the TD-OCC, and FDM.

The following will provide description of a first embodiment in which the FD-OCC being an enhanced FD-OCC according to Rel. 15 is applied, and a second embodiment in which the TD-OCC being an enhanced TD-OCC according to Rel. 15 is applied.

First Embodiment

The FD-OCC according to the first embodiment may be applied to M (M>2) RE pairs that are adjacent in the frequency direction in a given CDM group. The FD-OCC may correspond to the FD-OCC that the UE corresponding to NR later than Rel. 15 assumes to be applied to the DMRS. Note that more than two RE pairs may be referred to as an RE set, an RE group, or the like.

In other words, in the first embodiment, the FD-OCC having a sequence length of M may be used. In this case, the number of DMRS ports can be increased to M/2 times as large as that of Rel-15 NR. M may be, for example, 4, 8, 16, 32, or the like.

FIGS. 5A and 5B are each a diagram to show an example of the FD-OCC according to the first embodiment. In FIG. 5A, resources corresponding to antenna ports belonging to the same CDM group (for example, CDM group 0) are hatched.

The left side of FIG. 5A shows the FD-OCC according to Rel. 15 NR. The sequence ($\{w_f(0), w_f(1))\}$) of the FD-OCC according to Rel. 15 NR is applied to two RE pairs adjacent in the frequency direction in a given CDM group.

To be "adjacent in the frequency direction" may mean to be contiguous in the frequency direction, or may mean to be non-contiguous in the frequency direction but the closest in the same CDM group. For example, in a case of DMRS type 1, the two RE pairs adjacent in the frequency direction may be RE pairs corresponding to subcarriers k and k+2. In a case of DMRS configuration type 2, the two RE pairs adjacent in the frequency direction may be RE pairs corresponding to subcarriers k and k+1. Thus, to be "adjacent in the frequency direction" according to the present disclosure may be interpreted as to be "aligned in the frequency direction", to have "different frequencies", or the like.

The right side of FIG. 5A shows the FD-OCC that the UE corresponding to NR later than Rel. 15 assumes. The sequence ($\{w_f(0), w_f(1), w_f(2), w_f(3)\}$) of the FD-OCC is applied to four RE pairs adjacent in the frequency direction in a given CDM group. In a case of DMRS type 1, the four RE pairs adjacent in the frequency direction may be RE pairs corresponding to subcarriers k, k+2, k+4, and k+6. In a case of DMRS configuration type 2, the four RE pairs adjacent in the frequency direction may be RE pairs corresponding to subcarriers k, k+1, k+6, and k+7.

FIG. 5B is a diagram to show an example of $w_f(k')$ applied to the DMRS according to the first embodiment. m may represent an antenna port number or an index related to the antenna port number. For example, m may be 1000, or may be an antenna port number (for example, 2000 or the like) that is not used for the DMRS of type the same as that of Rel. 15. Note that p may be interpreted as an OCC index.

For example, to antenna ports m, m+1, m+2, and m+3, $w_f(0)$, $w_f(1)$, $w_f(2)$, and $w_f(3)$ are respectively applied, so as to be subjected to orthogonalization by using the FD-OCC. In other words, the DMRS of antenna ports m, m+1, m+2, and m+3 may be multiplexed on each of the same four RE pairs.

The subcarrier k to which the DMRS according to Rel-15 NR is mapped is expressed as k=4n+2k'+Δ (type 1) or k=6n+k'+Δ (type 2) (note that n=0, 1, . . . , k'=0, 1), whereas the subcarrier k to which the DMRS according to the first embodiment is mapped may be expressed as k=4*M/2*n+2k'+Δ (type 1) (note that n=0, 1, . . . k'=0, 1, . . . , M−1) or k=6*M/2*n+m+Δ (type 2) (note that m=k' (if k'=0, 1), m=6+(k'−2) (if k'=2, 3), and n=0, 1, . . . k'=0, 1, . . . , M−1), for example.

Some of the sets of $w_f(k')$ ({$w_f(0)$, $w_f(1)$, $w_f(2)$, $w_f(3)$} is regarded as one set) may have the same value as $w_f(k')$ of the FD-OCC according to Rel. 15 NR. In other words, the set of $w_f(k')$ according to the first embodiment may include repetition of $w_f(0)$ and $w_f(1)$ ({$w_f(0)$, $w_f(1)$, $w_f(0)$, $w_f(1)$, . . . }) of the FD-OCC according to Rel. 15 NR. In FIG. 5B, a case in which a set of $w_f(k')$ of p=m or m+2 is applied is equivalent to a case in which the FD-OCC according to Rel. 15 NR is applied.

Note that association between p and the set of $w_f(k')$ of FIG. 5B is not limited to this. For example, in the table of FIG. 5B, a table in which p is fixed but a row of the set of $w_f(k')$ is rearranged in any order may be used for the FD-OCC. The UE need not refer to the table itself as that shown in FIG. 5B. In such a case, the UE may perform processing corresponding to the OCC shown in the table (for example, the UE may derive $w_f(k')$ by using a function for implementing a relationship of the table).

This is similarly applied to the tables to be shown later in the present disclosure (in such a case, $w_f(k')$ may be interpreted as $w_t(l')$, and the FD-OCC may be interpreted as the TD-OCC, as appropriate).

The present example has illustrated an example in which the enhanced FD-OCC is applied to the single symbol DMRS. However, this is not restrictive, and for example, the enhanced FD-OCC may be applied to the double symbol DMRS in a similar method.

Figure 6A:
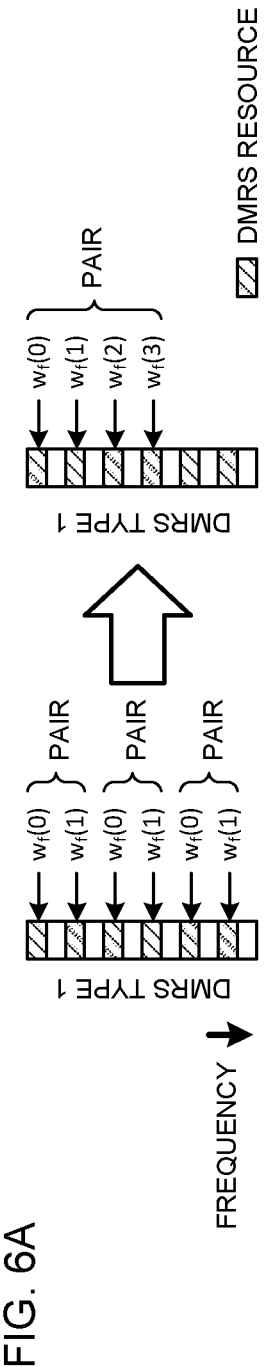
FIGS. 6A and 6B are each a diagram to show an example of the FD-OCC according to the first embodiment.
Figure 6B:
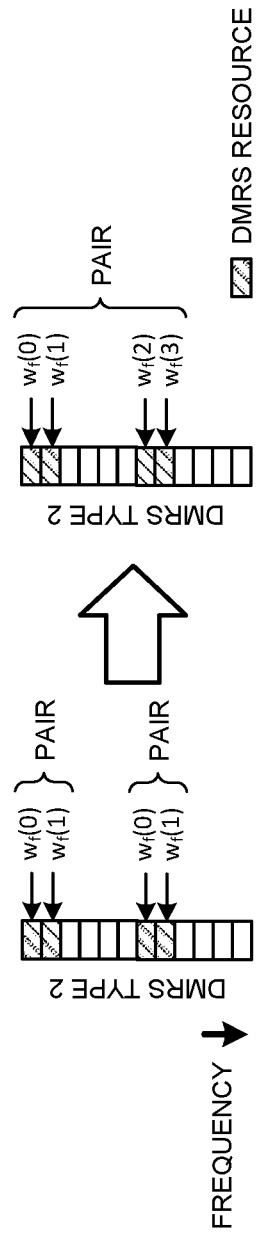

FIGS. 6A and 6B are each a diagram to show an example of the FD-OCC according to the first embodiment. FIG. 6A is the same as FIG. 5A, and thus overlapping description will not be repeated.

FIG. 6B corresponds to a table in which the orthogonal code of FIG. 5B is expressed in another manner (natural exponential function exp(z)).

FIGS. 7A and 7B are each a diagram to show an example of the FD-OCC according to the first embodiment. FIG. 7A is similar to FIG. 5A, and thus overlapping description will not be repeated. Note that, in the present example, $w_f(k')=\exp(j\alpha k')$.

In this case, as shown in FIG. 7B, the orthogonal code may be defined as α=0 (if p=m), α=π/2 (if p=m+1), α=π (if p=m+2), and α=3π/2 (if p=m+3). FIG. 7B is the same as the natural exponential function expression of FIG. 6B if applied to the configuration of FIG. 7A. Note that α may be referred to as a cyclic shift.

Note that a different table may be defined and used for each sequence length of the FD-OCC.

[Case where there is Excess of REs in Given Bandwidth]

As described above, when the FD-OCC having a sequence length of M (>2) is applied, there may be an excess of REs in a physical resource block (PRB) (in other words, the FD-OCC cannot be applied in one PRB). When there is an excess of REs in a given bandwidth (for example, the PRB), such a case may be coped with by using the method shown in FIGS. 8A and 8B.

Note that, stated differently, this case corresponds to a case in which the number of REs (subcarriers) of the DMRS resources in a given bandwidth cannot be divided by M without a remainder.

Figure 8A:
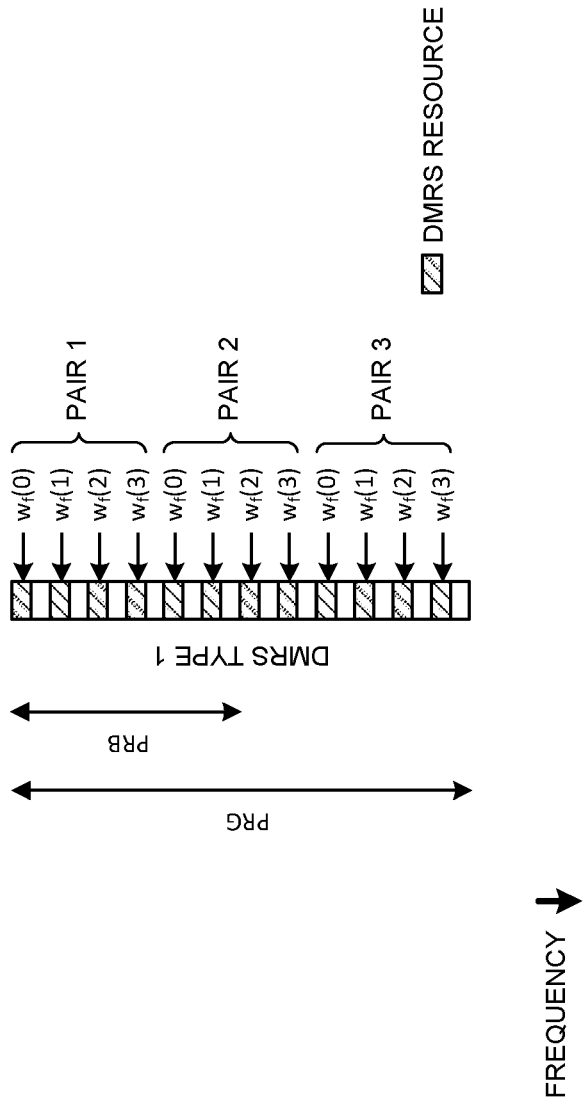
FIGS. 8A and 8B are each a diagram to show an example of the FD-OCC according to the first embodiment.
Figure 8B:
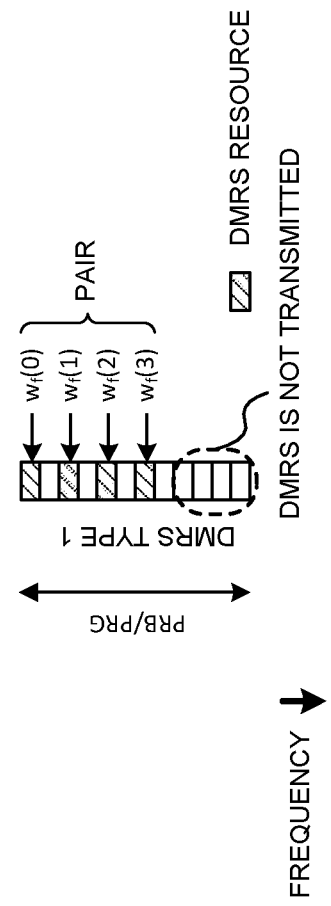

FIGS. 8A and 8B are each a diagram to show an example of the FD-OCC according to the first embodiment. In the present example, the FD-OCC of M=4 is applied.

When the FD-OCC cannot be applied to the REs only in one PRB, as shown in FIG. 8A, the UE may assume that the RE pairs to which the FD-OCC is applied are present over a plurality of PRBs. In FIG. 8A, the FD-OCC may be applied to a total of four REs, namely the REs of k=8 and 10 of PRB 0 and the REs of k=0 and 2 of PRB 1 by respectively using $w_f(0)$, $w_f(1)$, $w_f(2)$, and $w_f(3)$. In FIG. 8A, three RE pairs (pairs 1 to 3) may be used in two PRBs.

The PRBs to which the RE pairs of the FD-OCC belong may be contiguous PRBs, or may be non-contiguous PRBs. The PRBs to which the RE pairs of the FD-OCC belong may be, as shown in FIG. 8A, included in the same precoding resource block group (PRG).

One PRG may include one or more PRBs to which the same precoding is applied. This is because orthogonalization can be appropriately performed even when the FD-OCC is applied over a plurality of PRBs in the PRG, as it is assumed that precoding is applied in the unit of the PRG. One PRB may be interpreted as a plurality of PRBs.

The RE pairs to which the FD-OCC is applied may be configured by combining the REs in the PRG in ascending order or descending order of frequency (in FIG. 8A, the REs are combined in the ascending order).

Note that the same FD-OCC may be applied to different RE pairs, or different FD-OCCs may be applied to different RE pairs (for example, for each pair, the index of the FD-OCC may be incremented to be applied).

For example, the FD-OCC (set of $w_f(k')$) of p=m of FIG. 5B may be applied to all of pairs 1, 2, and 3 of FIG. 8A. The FD-OCCs of p=m, p=m+1, and p=m+2 of FIG. 5B may be respectively applied to pairs 1, 2, and 3 of FIG. 8A. Note that p shown above may be interpreted as mod(p, M) or the like. In other words, the OCC index may be incremented among the RE pairs so as to be repeatedly used.

Note that, for example, in a case of one PRG=odd-numbered PRBs, it may be assumed that there is an excess of REs in one PRB even when the FD-OCC is applied by using the RE pairs across the PRBs as shown in FIG. 8A.

When the FD-OCC cannot be applied to the REs only in one PRB or one PRG (there is an excess of REs of the DMRS), as shown in FIG. 8B, the UE may assume that the DMRS is not transmitted (which may be referred to as being dropped, muted, or the like), or that the DMRS is transmitted without application of the FD-OCC in the one PRG or in the excess of the REs in the one PRB. According to such a configuration as described above, compatibility with a Rel. 15 DMRS can be preferably maintained.

In the case of FIG. 8B, the FD-OCC may be applied to a total of four REs, namely k=0, 2, 4, and 6 of the PRB/PRG shown in the figure by respectively using $w_f(0)$, $w_f(1)$, $w_f(2)$, and $w_f(3)$. In contrast, in the REs of k=8 and 10 of the PRB/PRG, the DMRS need not be transmitted, or the DMRS to which the FD-OCC is not applied may be transmitted.

Note that it may be assumed that the TD-OCC to be described later is applied to the excess of the REs in the PRB/PRG (or the REs to which the FD-OCC is not applied).

The UE may assume that a given FD-OCC is applied in the one PRG or the excess of the REs in the one PRB. The given FD-OCC may be the FD-OCC according to Rel. 15 NR (OCC having a sequence length of 2), or may correspond to multiplication of a part of $w_f(k')$ included in the set of $w_f(k')$ corresponding to a given index (for example, m) of the OCC having a sequence length of M described above. For example, in the case of FIG. 8B, $w_f(0)$ and $w_f(1)$ of p=m may be respectively applied to the REs of k=8 and 10 of the PRB/PRG.

Information as to whether or not the DMRS is transmitted by using the excess of the REs in the PRB/PRG, whether or not the OCC (FD-OCC/TD-OCC) is applied to the excess of the REs in the PRB/PRG, or the like may be configured (indicated) for the UE by using higher layer signaling, physical layer signaling, or a combination of these. Based on the information, the UE may determine whether given REs are to be used for transmission and reception of the DMRS, or may determine transmission and reception processing of the REs of the DMRS.

Note that the PRG according to the present disclosure may be interpreted as a width of PRB bundling (frequency resources to which PRB bundling is applied), or may be interpreted as a width of the PDSCH (a transmission bandwidth of the PDSCH).

According to the first embodiment described in the above, for example, even when the UE according to a new release and the UE according to an old release coexist, the DMRS for each of the UEs can be appropriately subjected to orthogonalization by using the FD-OCC.

Second Embodiment

The TD-OCC according to a second embodiment may be applied to RE pairs of N (N>1) symbols including non-contiguous symbols. The TD-OCC may correspond to the TD-OCC that the UE corresponding to NR later than Rel. 15 assumes to be applied to the DMRS.

In other words, in the second embodiment, the TD-OCC having a sequence length of N may be used. In this case, the number of DMRS ports can be increased to N times (in a case of the single symbol DMRS) or N/2 times (in a case of the double symbol DMRS) as large as that of Rel-15 NR. N may be, for example, 2, 4, 8, 16, 32, or the like.

The TD-OCC according to the second embodiment may be applied between the front-loaded DMRS (in other words, the DMRS that is transmitted first in a PDSCH/PUSCH transmission period) and the additional DMRS.

Figure 9A:
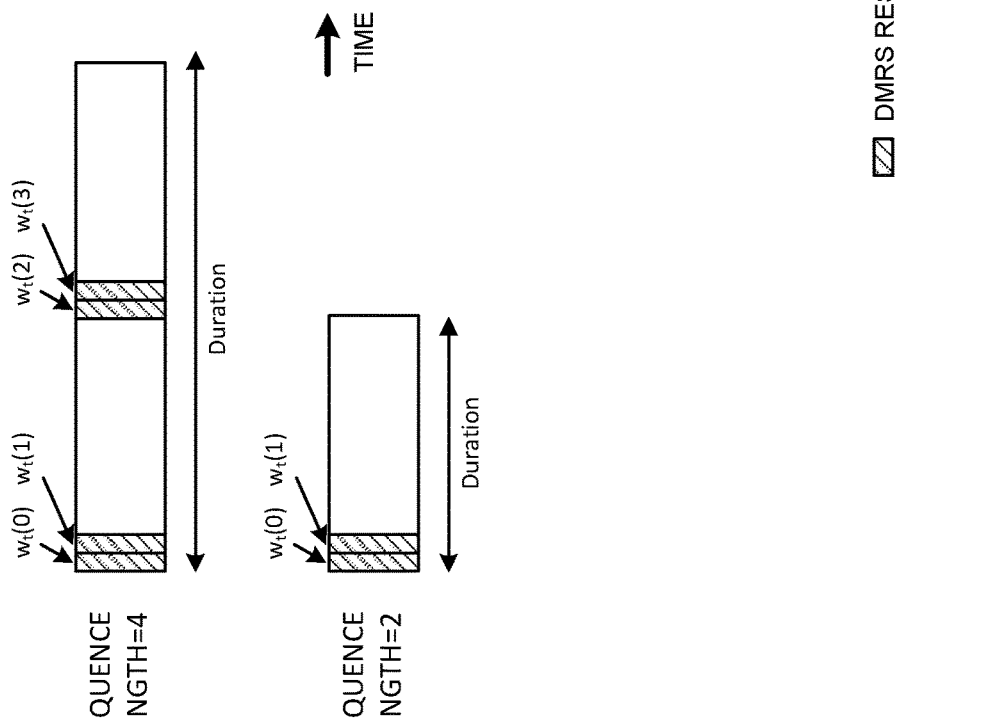
FIGS. 9A and 9B are each a diagram to show an example of a TD-OCC according to a second embodiment.
Figure 9B:
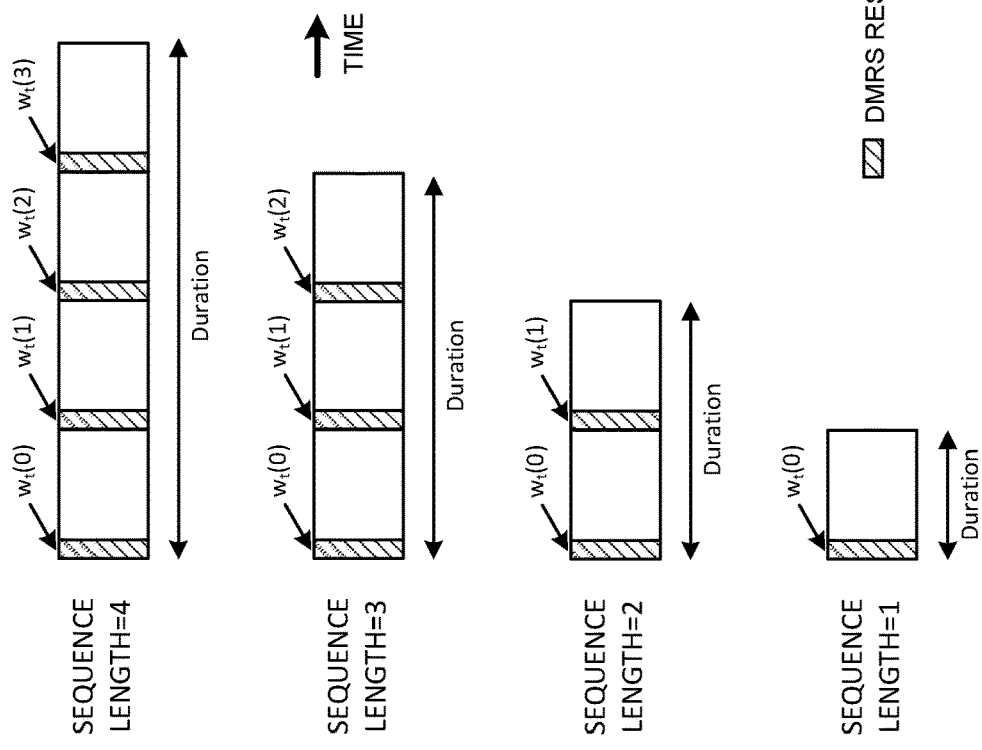

FIGS. 9A and 9B are each a diagram to show an example of the TD-OCC according to the second embodiment. In the present example, resources corresponding to antenna ports belonging to the same CDM group (for example, CDM group 0) are hatched.

FIG. 9A shows an example of the TD-OCC applied to the single symbol DMRS, and FIG. 9B shows an example of the TD-OCC applied to the double symbol DMRS.

As shown in FIGS. 9A and 9B, in any of the cases of the single symbol DMRS and the double symbol DMRS, the sequence length of the TD-OCC may be equal to the number of symbols of the DMRS in given duration (or slot or sub-slot) (in other words, the number of symbols to which the DMRS is mapped).

The duration may mean duration between the first OFDM symbol in a slot and the last OFDM symbol of the PDSCH/PUSCH resource scheduled in the slot (mapping type A), or may mean the number of OFDM symbols of the scheduled PDSCH/PUSCH resource (mapping type B).

In the case of the single symbol DMRS of FIG. 9A, a set ($\{w_t(0), \ldots, w_t(N-1)\}$) of the sequence of the TD-OCC is applied to each DMRS symbol (RE pair thereof) in the duration.

As shown in the bottom of FIG. 9A, when the sequence length is 1 (when the length of the duration is such a length as not to require mapping of the additional DMRS) regarding the single symbol DMRS, the UE may assume that the TD-OCC is not applied to the DMRS (in this case, $w_t(0)$=1).

In the double symbol DMRS of FIG. 9B, the set ($\{w_t(0), \ldots, w_t(N-1)\}$) of the sequence of the TD-OCC is applied to each DMRS symbol (RE pair thereof) in the duration. Thus, w (l') corresponding to four DMRSs is respectively denoted by $w_t(0)$, $w_t(1)$, $w_t(2)$, and $w_t(3)$. In contrast, in existing Rel. 15 NR, regarding the double symbol DMRS, the TD-OCC having a sequence length of 2 is applied to each pair of double symbols (to give description by taking the upper example of FIG. 9B, $w_t(l')$ corresponding to four DMRSs is respectively $w_t(0)$, $w_t(1)$, $w_t(0)$, and $w_t(1)$).

Examples of the value of $w_t(l')$ corresponding to each sequence length will be described later. Note that FIGS. 9A and 9B and subsequent figures assume that $w_t(0), \ldots, w_t(N-1)$ are applied in order from the first DMRS of the duration. However, the order of sequences for the application is not limited to this.

Note that the TD-OCC according to the second embodiment may be applied to both of the single symbol DMRS and the double symbol DMRS. In this case, the number of DMRS ports can be preferably increased regardless of whether it is single or double.

The TD-OCC according to the second embodiment may be applied only to the single symbol DMRS. The single symbol DMRS can be supported by all of Rel. 15 UEs, and thus in many cases the TD-OCC can be applied.

The TD-OCC according to the second embodiment may be applied only to the double symbol DMRS. It is assumed that a case in which the double symbol DMRS is used occurs under an environment in which increase of the DMRS ports is strongly required, and thus the number of DMRS ports can be preferably increased when increase in the number of ports is important.

The TD-OCC according to the second embodiment may be used when frequency hopping is not applied to the DMRS (or the PDSCH/PUSCH). The TD-OCC according to the second embodiment may be used exclusively within a hop when frequency hopping is applied to the DMRS (or the PDSCH/PUSCH).

[Control on Case where DMRS Resource Overlaps Resource of Another Channel/Signal]

The DMRS used by the UE according to a new release need not overlap the DMRS used by the UE according to an old release. In other words, the DMRS according to a new release may be mapped to resources that are different from the resources (for example, non-DMRS resources according to Rel. 15 NR) to which the DMRS according to an old release may be mapped. For example, the DMRS resource according to a new release may correspond to the non-DMRS resource according to an old release.

When the DMRS used by the UE according to a new release and the DMRS used by the UE according to an old release do not overlap, the DMRS resources of one of the UEs may overlap resources (in other words, resources other than the DMRS) of another channel/signal of the other UE. Such a case occurs not only in a case in which the DMRS resources that may be used in a new release are different from the DMRS resources that may be used in an old release, but also in a case in which the additional DMRS is configured for the UE according to a new release whereas the additional DMRS is not configured for the UE according to an old release.

In these cases, there is a problem that the DMRS receives interference or gives interference. Note that, in these cases, the new release may be interpreted as an old release, and the old release may be interpreted as a new release (in other words, the same problem may also be caused between new releases or the like).

In this case, it is preferable that the other UE be able to perform rate match of the other channel/signal in consideration of the DMRS resources. Note that, in the present disclosure, rate match (or rate matching) and puncture (or puncturing) may be interchangeably interpreted.

Figure 10A:
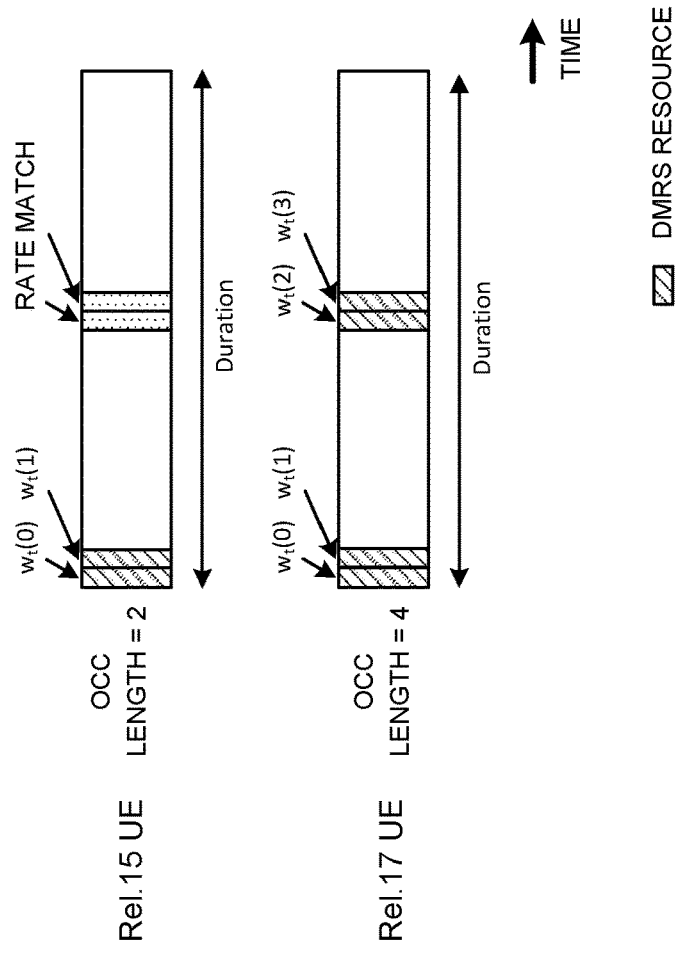
FIGS. 10A and 10B are each a diagram to show an example of a case in which DMRS resources of a UE according to a new release overlap resources other than those of a DMRS of a UE according to an old release.
Figure 10B:
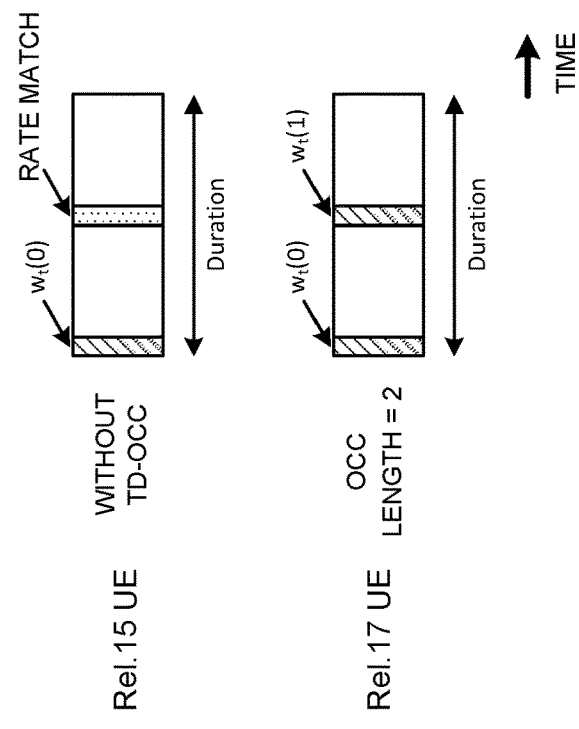

FIGS. 10A and 10B are each a diagram to show an example of a case in which the DMRS resources of the UE according to a new release overlap resources other than those of the DMRS of the UE according to an old release.

FIG. 10A shows an example of the single symbol DMRS, and FIG. 10B shows an example of the double symbol DMRS.

The DMRS of a Rel. 17 UE of FIG. 10A is the same as the DMRS having a sequence length of 2 of FIG. 9A. In contrast, the DMRS of the Rel. 15 UE is mapped to the symbols multiplied by $w_t(0)$ out of the DMRS of the Rel. 17 UE, but is not mapped to the symbols multiplied by $w_t(1)$. It is preferable that, regarding the DMRS of the Rel. 15 UE, rate match be performed on the resources (for example, the PDSCH resources) other than those of the DMRS around the symbol multiplied by $w_t(1)$.

The DMRS of the Rel. 17 UE of FIG. 10B is the same as the DMRS having a sequence length of 4 of FIG. 9B. In contrast, the DMRS of the Rel. 15 UE is mapped to the symbols multiplied by $w_t(0)$ and $w_t(1)$ out of the DMRS of the Rel. 17 UE, but is not mapped to the symbols multiplied by $w_t(2)$ and $w_t(3)$. It is preferable that, regarding the DMRS of the Rel. 15 UE, rate match be performed on the resources (for example, the PDSCH resources) other than those of the DMRS around the symbol multiplied by $w_t(1)$.

However, in the cases as shown in FIGS. 10A and 10B, how to cause the Rel. 15 UE to perform rate match poses a problem.

In view of this, rate matching resources for implementing mapping (scheduling) including resources (REs) the same as the DMRS resources as shown in FIGS. 10A and 10B may be defined or configured.

For example, when at least a part of the DMRS resources of the UE according to a new release and the resources (for example, the PDSCH resources) other than those of the DMRS of the UE according to an old release overlap, the UE according to an old release may assume that the zero power CSI-RS (ZP-CSI-RS) indicating overlapping resources is configured.

In other words, the UE according to an old release may assume that the resources of the configured ZP-CSI-RS correspond to at least a part of the DMRS resources of the UE according to a new release.

The UE according to an old release may apply rate match to the PDSCH, if the resources of the ZP-CSI-RS and, for example, the PDSCH resources overlap. In other words, when the resources of the ZP-CSI-RS and scheduling of the PDSCH overlap, the UE may perform reception processing (for example, demodulation, decoding, or the like) of the PDSCH by assuming that the PDSCH is subjected to rate match avoiding the ZP-CSI-RS.

The ZP-CSI-RS includes DMRS resources added in the new release from the old release and may be configured to completely overlap (entirely include) the PDSCH resources in which the UE according to an old release is scheduled.

Figure 11A:
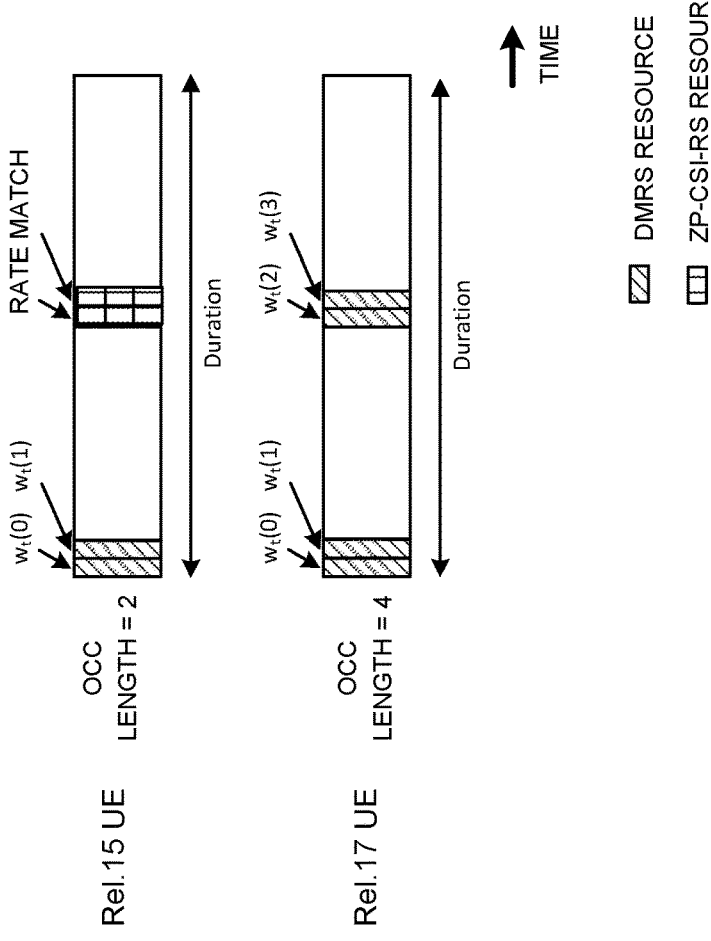
FIGS. 11A and 11B are each a diagram to show an example of a configuration of ZP-CSI-RS resources.
Figure 11B:
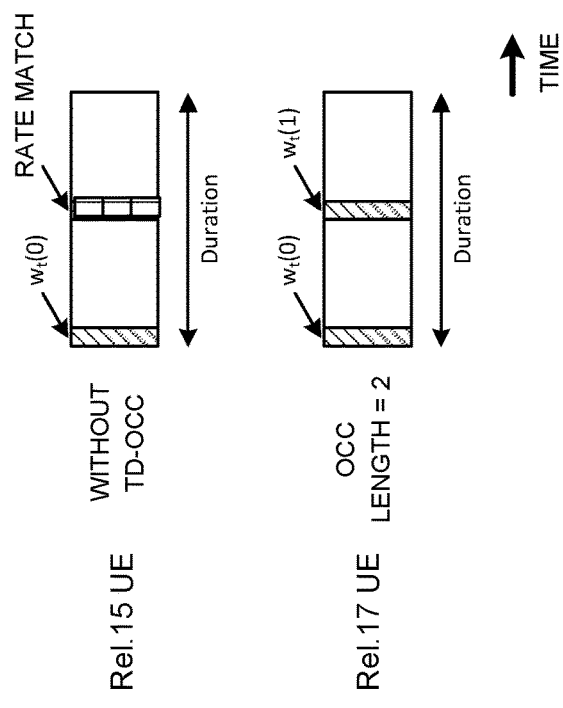

FIGS. 11A and 11B are each a diagram to show an example of a configuration of the ZP-CSI-RS resources.

The Rel. 17 UE of FIG. 11A uses the single symbol DMRS (with one additional DMRS) in duration of the figure. In contrast, the Rel. 15 UE uses the single symbol DMRS (without the additional DMRS) in the same duration. For the Rel. 15 UE, the resources used by the Rel. 17 UE for the additional DMRS are configured as the ZP-CSI-RS resources, and the Rel. 15 UE can appropriately perform rate match regarding the resources.

The Rel. 17 UE of FIG. 11B uses the double symbol DMRS (with one additional DMRS) in duration of the figure. In contrast, the Rel. 15 UE uses the double symbol DMRS (without the additional DMRS) in the same duration. For the Rel. 15 UE, the resources used by the Rel. 17 UE for the additional DMRS are configured as the ZP-CSI-RS resources, and the Rel. 15 UE can appropriately perform rate match regarding the resources.

When the resources other than the DMRS resources according to an old release are configured for the DMRS resources according to a new release by using the ZP-CSI-RS resources as described above, at least a part of the DMRSs of the UEs according to new and old releases can be multiplexed in an overlapping (or completely overlapping) manner, with the result that spectral efficiency can be enhanced.

Note that, in contrast, when at least a part of the DMRS resources of the UE according to an old release and the resources (for example, the PDSCH resources) other than those of the DMRS of the UE according to a new release overlap, the UE according to a new release may assume that the ZP-CSI-RS indicating the overlapping resources is configured.

In other words, the UE according to a new release may assume that the resources of the configured ZP-CSI-RS correspond to at least a part of the DMRS resources of the UE according to an old release.

The UE according to a new release may apply rate match to the PDSCH, if the resources of the ZP-CSI-RS and, for example, the PDSCH resources overlap. In other words, when the resources of the ZP-CSI-RS and scheduling of the PDSCH overlap, the UE may perform reception processing (for example, demodulation, decoding, or the like) of the PDSCH by assuming that the PDSCH is subjected to rate match avoiding the ZP-CSI-RS.

The ZP-CSI-RS may include the DMRS resources decreased in the new release from the old release. The ZP-CSI-RS may be configured to completely overlap (entirely include) the PDSCH resources in which the UE according to a new release is scheduled.

Figures 12A, 12B:
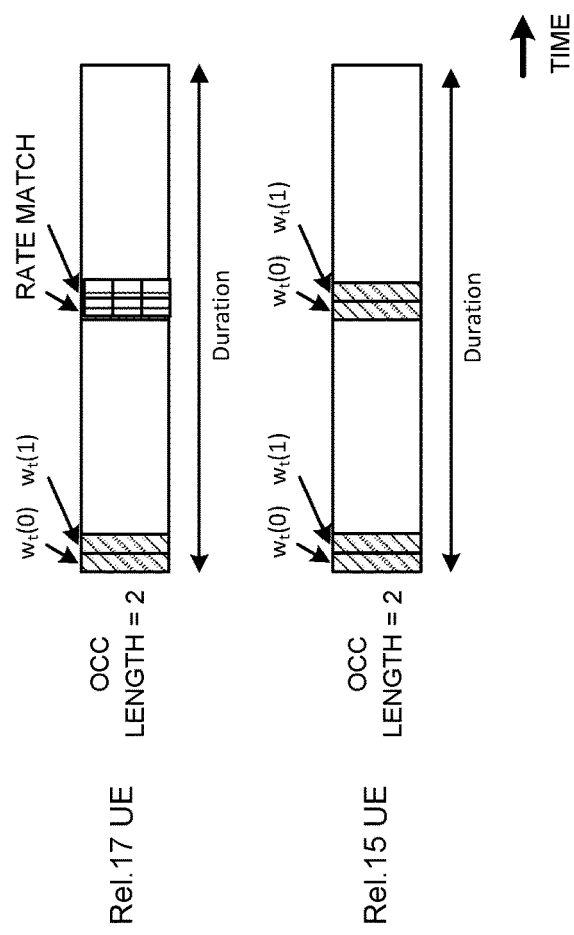
FIGS. 12A and 12B are each a diagram to show an example of a configuration of ZP-CSI-RS resources.

FIGS. 12A and 12B are each a diagram to show an example of a configuration of the ZP-CSI-RS resources.

The Rel. 15 UE of FIG. 12A uses the single symbol DMRS (with one additional DMRS) in duration of the figure. In contrast, the Rel. 17 UE uses the single symbol DMRS (without the additional DMRS) in the same duration. For the Rel. 17 UE, the resources used by the Rel. 15 UE for the additional DMRS are configured as the ZP-CSI-RS resources, and the Rel. 17 UE can appropriately perform rate match regarding the resources.

The Rel. 15 UE of FIG. 12B uses the double symbol DMRS (with one additional DMRS) in duration of the figure. In contrast, the Rel. 17 UE uses the double symbol DMRS (without the additional DMRS) in the same duration. For the Rel. 17 UE, the resources used by the Rel. 15 UE for the additional DMRS are configured as the ZP-CSI-RS resources, and the Rel. 17 UE can appropriately perform rate match regarding the resources.

When the resources other than the DMRS resources according to a new release are configured for the DMRS resources according to an old release by using the ZP-CSI-RS resources as described above, at least a part of the DMRSs of the UEs according to new and old releases can be multiplexed in an overlapping (or completely overlapping) manner, with the result that spectral efficiency can be enhanced.

Note that the resources of the ZP-CSI-RS are not limited to being located at positions shown in FIGS. 11A and 11B, FIGS. 12A and 12B, and the like. The configured ZP-CSI-RS resources may be, for example, any resource of the ZP-CSI-RS whose specifications are drafted in Rel. 15 NR.

In the present disclosure, the resources of the ZP-CSI-RS may be interpreted as resources for rate match.

For the UE according to a new release, information as to whether or not the PDSCH (a part thereof) is subjected to rate match may be reported (configured, indicated) from the network by using higher layer signaling, physical layer signaling, or a combination of these.

For example, the information may be reported to the UE so that a part of the PDSCH resources of the UE according to Rel. 17, which is the UE that does not require a large number of DMRS ports, is subjected to rate match.

The UE may assume that the UE does not perform rate match on the PDSCH that is scheduled by using a given DCI format (for example, DCI format 0_0) or the DCI detected in a common search space set (this is because, when rate match is performed, the coding rate of data is increased and the error rate is reduced).

Figure 13A:
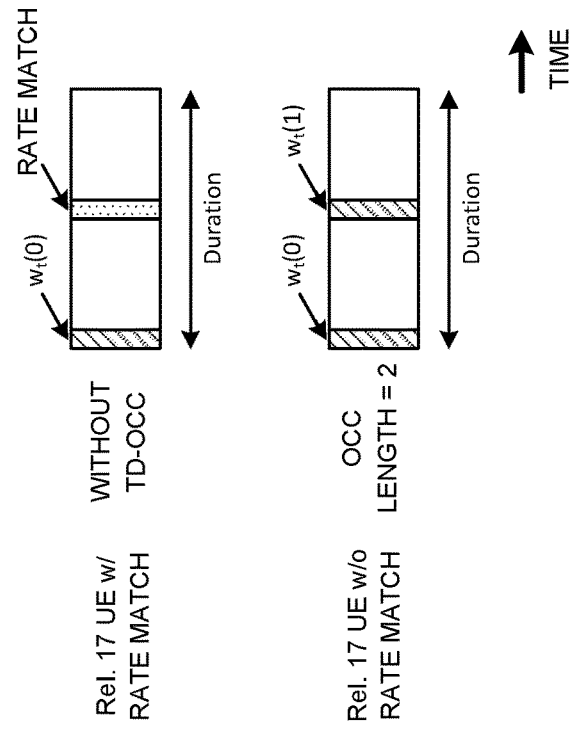
FIGS. 13A and 13B are each a diagram to show an example of specification as to whether or not rate match is used.
Figure 13B:
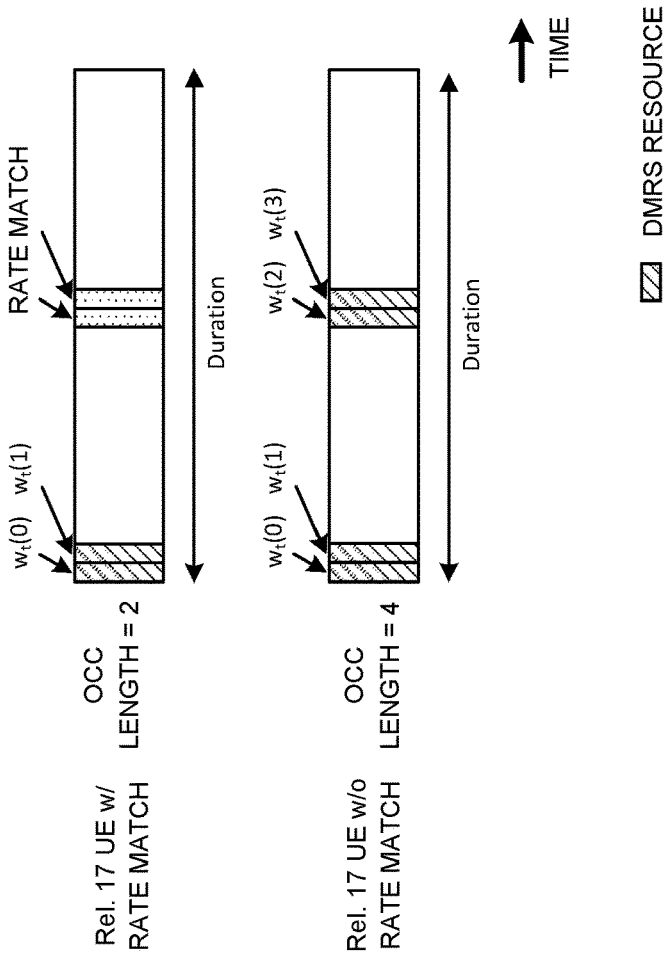

FIGS. 13A and 13B are each a diagram to show an example of specification as to whether or not rate match is used. The Rel. 17 UE w/o rate match of FIGS. 13A and 13B is the same as the Rel. 17 UE of FIGS. 11A and 11B, and thus the same description will not be repeated.

The Rel. 17 UE w/rate match of FIG. 13A uses the single symbol DMRS (without the additional DMRS) in duration of the figure. There is an indication for the UE to perform rate match on the resources used by the Rel. 17 UE w/o rate match for the additional DMRS in the same duration, and the UE can appropriately perform rate match regarding the resources.

The Rel. 17 UE w/rate match of FIG. 13B uses the double symbol DMRS (without the additional DMRS) in duration of the figure. There is an indication for the UE to perform rate match on the resources used by the Rel. 17 UE w/o rate match for the additional DMRS in the same duration, and the UE can appropriately perform rate match regarding the resources.

FIGS. 14A to 14C are each a diagram to show an example of $w_t(l')$ applied to the DMRS according to the second embodiment. FIGS. 14A, 14B, and 14C correspond to sequence lengths of 2, 3, and 4, respectively.

As shown in FIG. 14A, $w_t(l')$ of the TD-OCC having a sequence length of 2 may be, for example, the same as $w_t(l')$ of the TD-OCC for the double symbol DMRS according to Rel. 15 NR.

As shown in FIG. 14B, $w_t(l')$ of the TD-OCC having a sequence length of 3 may be, for example, defined as $\alpha=0$ (if p=m), $\alpha=2\pi/3$ (if p=m+1), and $\alpha=4\pi/3$ (if p=m+2), on the condition that $w_t(l')=\exp(j\alpha l')$. Note that a set of a corresponding to the set of $w_t(l')$ may be $\{0, \pm\pi/3, \pm2\pi/3\}$, $\{0, -2\pi/3, -4\pi/3\}$, or the like.

As shown in FIG. 14C, $w_t(l')$ of the TD-OCC having a sequence length of 4 may be derived based on tables similar to those of FIG. 5B and FIG. 6B, or may be derived by using a cyclic shift.

Regarding the TD-OCC according to the second embodiment, in order to maintain compatibility with the TD-OCC for the double symbol DMRS according to Rel. 15 NR, it is only necessary that, regarding the double symbol DMRS, a set of $w_t(l')$ including $\{+1, +1\}$ or $\{+1, -1\}$ be adopted as $\{w_t(i), w_t(i+1)\}$ (i is an even number) with the use of an even-numbered sequence length.

Figures 15A, 15B:
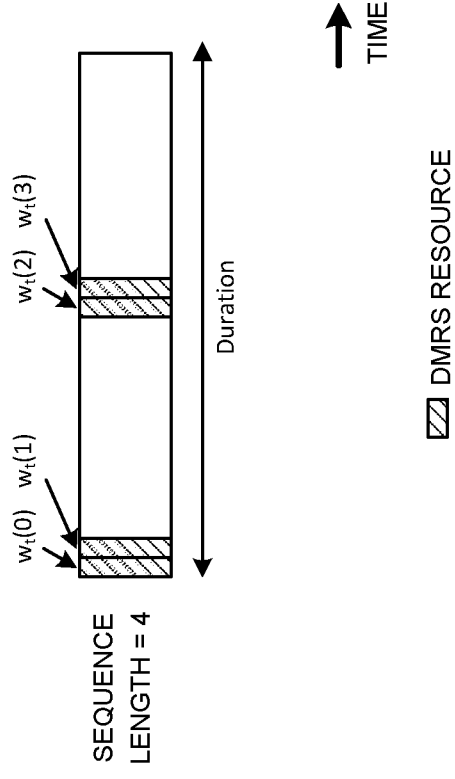
FIGS. 15A and 15B are each a diagram to show an example of the TD-OCC according to the second embodiment having compatibility with the TD-OCC of a double symbol DMRS according to Rel. 15 NR.

FIGS. 15A and 15B are each a diagram to show an example of the TD-OCC according to the second embodiment having compatibility with the TD-OCC of the double symbol DMRS according to Rel. 15 NR. In the present example, a sequence length N is 4. The double symbol DMRS is used.

As $w_t(0), \ldots, w_t(3)$ shown in FIG. 15A, the sequence of FIG. 15B may be used (this is the same as the sequence of FIG. 14C).

Some of the sets of $w_t(l')$ ($\{w_t(0), \ldots, w_t(3)\}$ is regarded as one set) may have the same value as $w_t(l')$ of the TD-OCC according to Rel. 15 NR. In other words, the set of $w_t(1')$ according to the second embodiment may include repetition of $w_t(0)$ and $w_t(1)$ ($\{w_t(0), w_t(1), w_t(0), w_t(1), \ldots \}$) of the TD-OCC according to Rel. 15 NR.

In FIG. 15B, a case in which a set of $w_t(l')$ of p=m or m+2 is applied is equivalent to a case in which the TD-OCC according to Rel. 15 NR is applied, and compatibility with Rel. 15 can be preferably maintained.

Figures 16A, 16B:
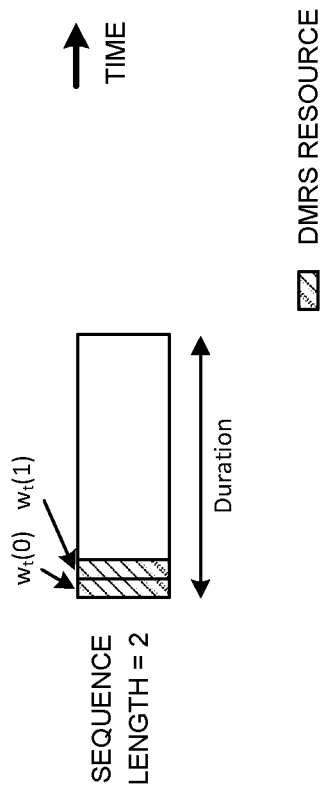
FIGS. 16A and 16B are each a diagram to show an example of the TD-OCC according to the second embodiment having compatibility with the TD-OCC of a double symbol DMRS according to Rel. 15 NR.

FIGS. 16A and 16B are each a diagram to show an example of the TD-OCC according to the second embodiment having compatibility with the TD-OCC of the double symbol DMRS according to Rel. 15 NR. In the present example, a sequence length N is 2. The double symbol DMRS is used.

As $w_t(0)$ and $w_t(1)$ shown in FIG. 16A, the sequence of FIG. 16B may be used (this is the same as the sequence of FIG. 14A).

The set of $w_t(l')$ may have the same value as $w_t(l')$ of the TD-OCC according to Rel. 15 NR in the same time resources. This case is equivalent to a case in which the TD-OCC according to Rel. 15 NR is applied, and compatibility with Rel. 15 can be preferably maintained.

According to the second embodiment described in the above, for example, even when the UE according to a new release and the UE according to an old release coexist, the DMRS for each of the UEs can be appropriately subjected to orthogonalization by using the TD-OCC.

Note that assumption, processing, and the like related to rate match described in the second embodiment may also be applied to a case in which the OCC (for example, the TD-OCC) is not applied to the DMRS.

<Additional Notes>

When the "DMRS according to a new release" is configured for the UE according to a new release by using higher layer signaling (for example, the UE according to a new release receives DMRS configuration information for a new release), the UE according to a new release may assume to apply at least one of the OCCs according to the embodiments described above to the DMRS, and when the "DMRS according to a new release" is not configured for the UE according to a new release, the UE may assume to apply the OCC according to Rel. 15 to the DMRS.

When the UE according to a new release multiplexes the PDSCH/PUSCH with the same resource as that of the UE according to an old release, the UE according to a new release may assume that a newly added DMRS port (DMRS port to which the OCC according to the first and second embodiments described above is applied) is configured. In this case, the UE according to a new release may assume that a new OCC is applied, or may assume that a new OCC (for example, the set of $w_f(k')$ of p=m or m+2 of FIG. 5B) that is substantially the same OCC as that of Rel. 15 is applied.

The DMRS resources according to a new release and the DMRS resources according to an old release need not be allocated to the same time frequency resources as each other, and may be subjected to time division multiplexing (TDM), may be subjected to frequency division multiplexing (FDM), or may be subjected to space division multiplexing (SDM).

Figure 17:
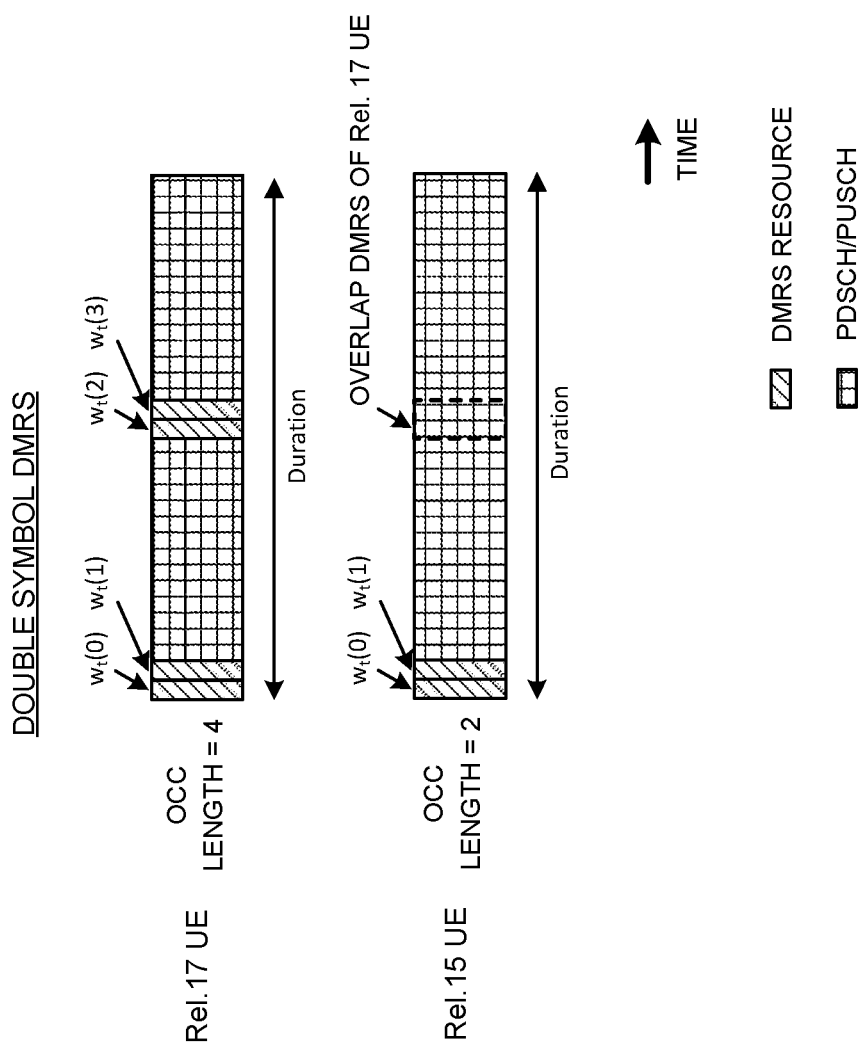
FIG. 17 is a diagram to show an example in which DMRS resources according to a new release and a PDSCH/PUSCH according to an old release overlap.

For example, as shown in FIG. 17, a part or all of the DMRS resources of the UE according to a new release may overlap the PDSCH/PUSCH of the UE according to an old release, or may overlap with another channel/signal. By adopting such a configuration, a flexible DMRS can be designed without regard to the DMRS position of an old release, orthogonality of the OCC, and the like.

FIG. 17 is a diagram to show an example in which the DMRS resources according to a new release and the PDSCH/PUSCH according to an old release overlap. The UE may assume that the DMRS resources overlapping such resources according to another release are subjected to orthogonalization (layer separation) by a beam/precoder. In this case, the UE need not apply interference cancellation to the overlapping DMRS resources.

The DMRS resources corresponding to a given antenna port in one PRG/PRB may be subjected to FDM with the DMRS resources corresponding to another antenna port.

Figure 18B:
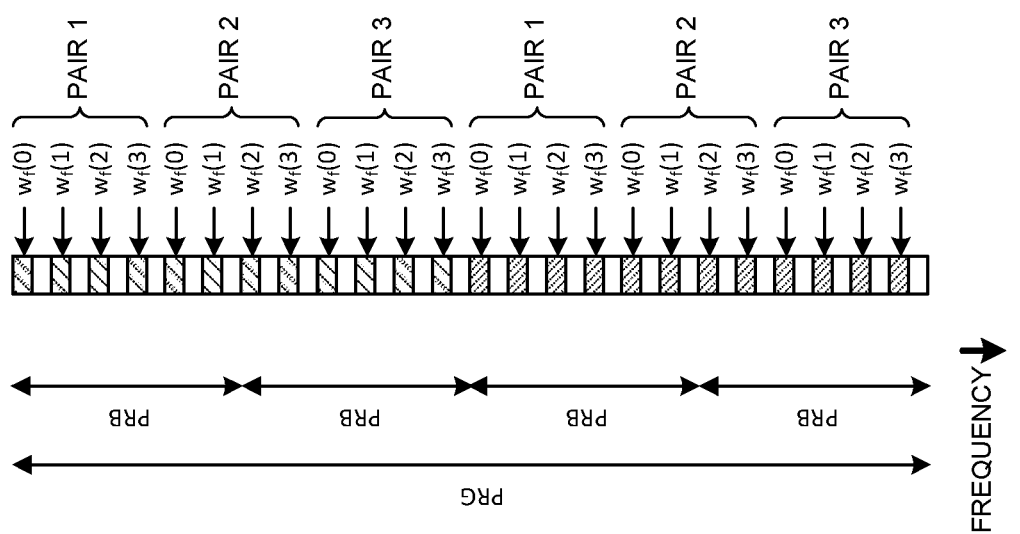
FIGS. 18A and 18B are each a diagram to show an example in which the DMRS is subjected to FDM for each antenna port.
Figure 18A:
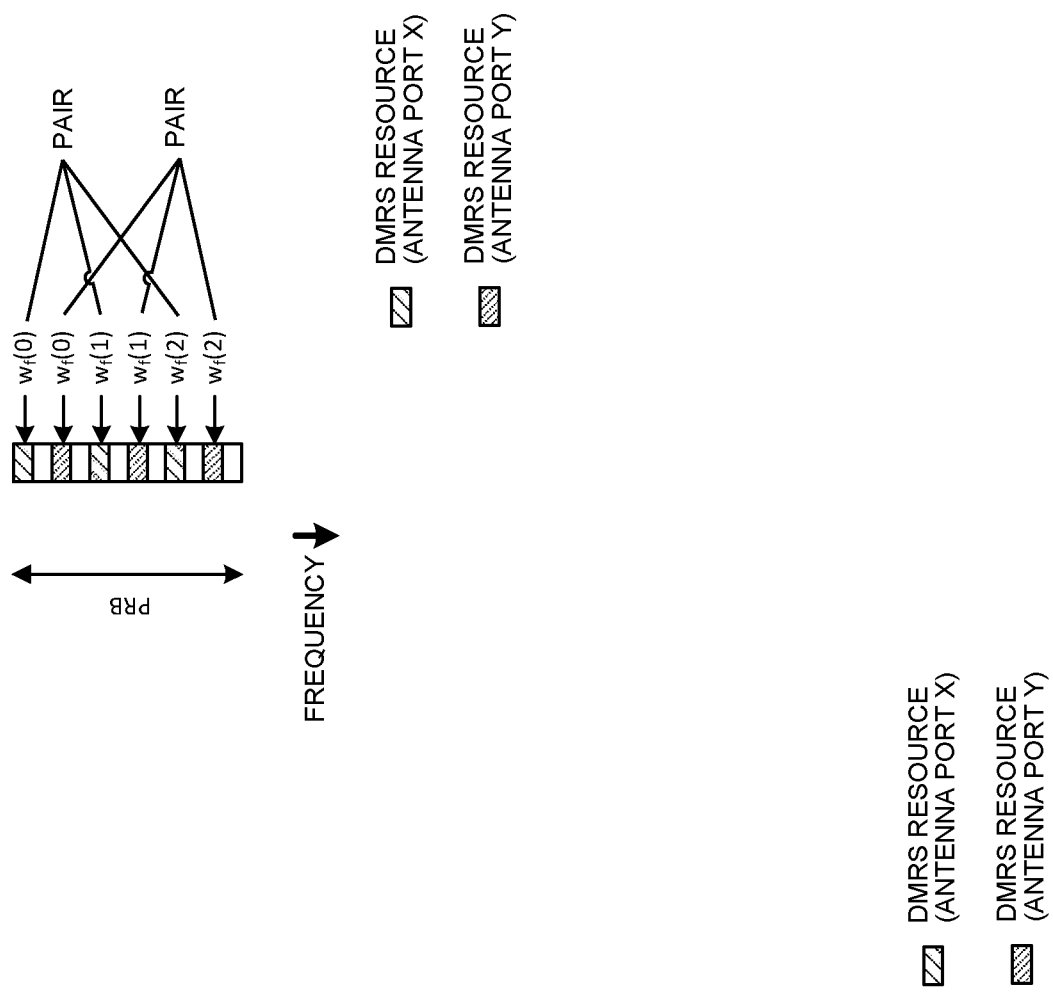

FIGS. 18A and 18B are each a diagram to show an example in which the DMRS is subjected to FDM for each antenna port. In FIG. 18A, four PRBs are included in one PRG. Among the four PRBs, two PRBs are used for DMRS resource mapping of antenna port X, and the other two PRBs are used for DMRS resource mapping of antenna port Y. Either one or both of the ports X and Y may correspond to a port number(s) used for an old release, or either one or both of the ports X and Y may correspond to a port number(s) used for a new release.

One PRG/PRB of FIG. 18B is used for DMRS resource mapping of antenna ports that are alternately different from each other (or in a shape of teeth of a comb). For example, subcarriers 0, 4, and 8 may be used for antenna port X, and subcarriers 2, 6, and 10 may be used for antenna port Y.

According to the configuration shown in FIGS. 18A and 18B, the number of DMRS ports can be preferably increased. Compatibility with an old release can be easily secured.

Note that, in each embodiment described above, it may be assumed that both of the UE according to an old release and the UE according to a new release are connected to the same serving cell, or it may be assumed that the UE according to an old release and the UE according to a new release are connected to different serving cells.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 19:
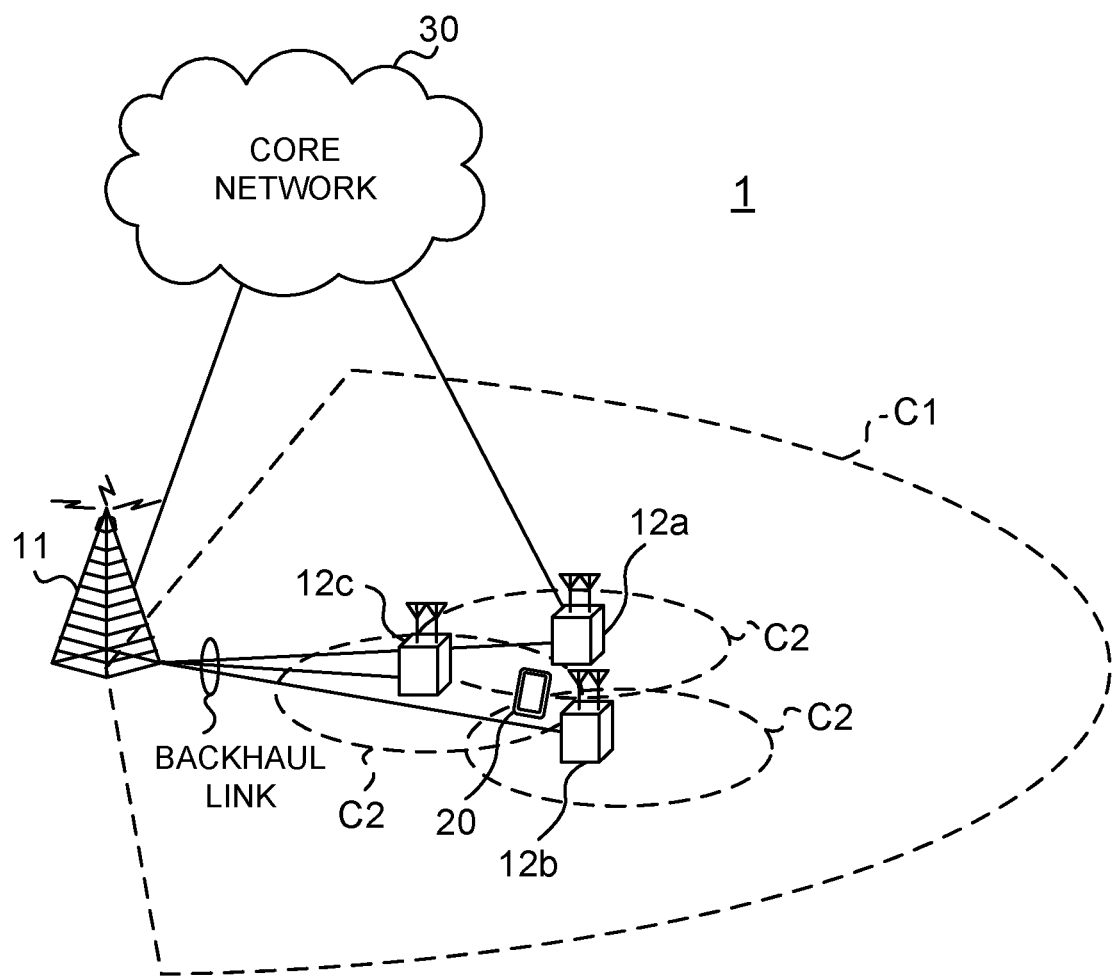
FIG. 19 is a diagram to show an example of a schematic structure of a radio communication system according to one embodiment.

FIG. 19 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz).

Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 20:
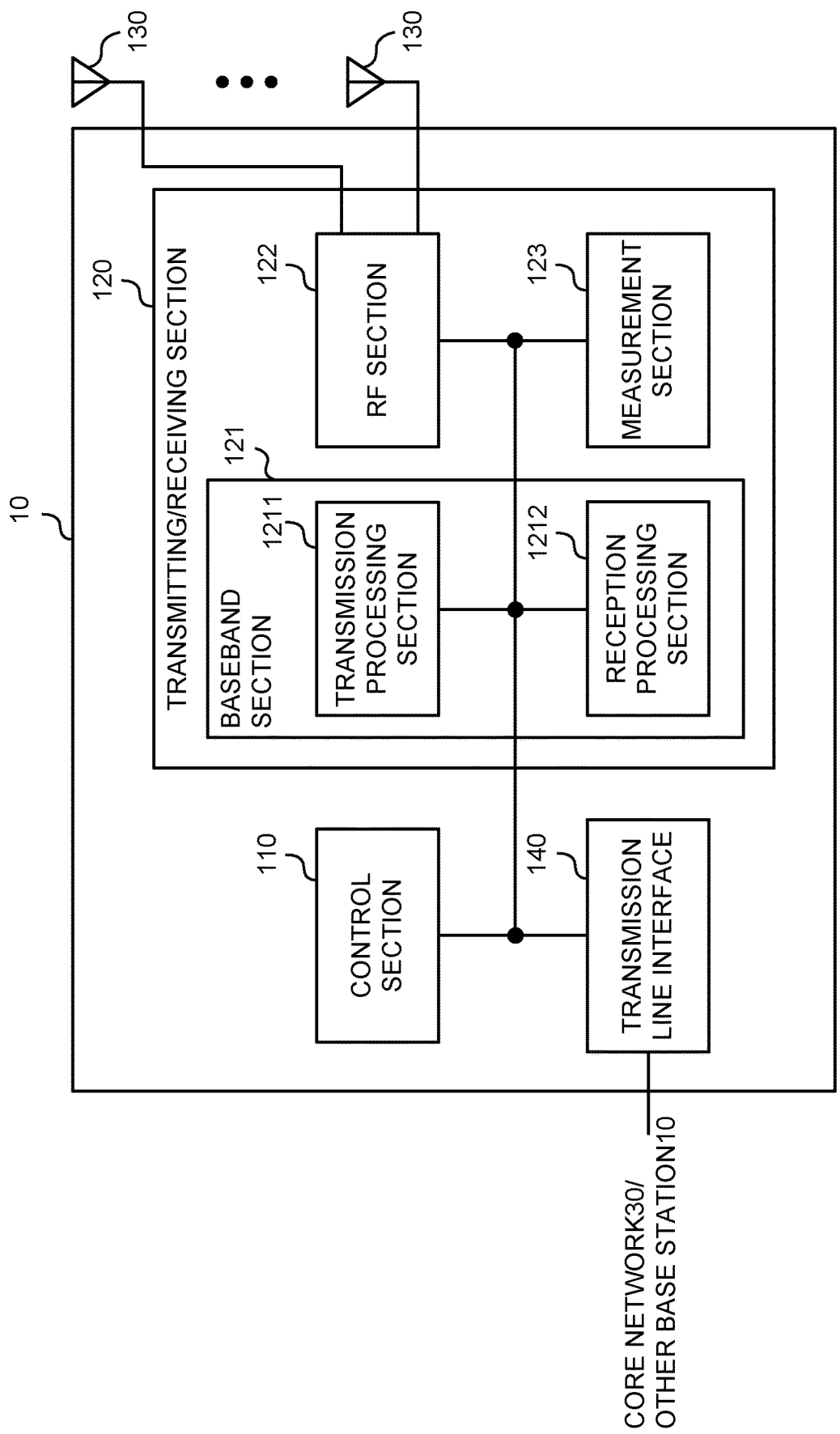
FIG. 20 is a diagram to show an example of a structure of a base station according to one embodiment.

FIG. 20 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on.

The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal.

For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the control section 110 may assume that a frequency domain orthogonal cover code (FD-OCC) having a sequence length of a number (for example, M) larger than two is applied to a demodulation reference signal (DMRS) mapped to pairs of resource elements (REs) in the number larger than two with different frequencies.

The transmitting/receiving section 120 may perform transmission processing or reception processing of the demodulation reference signal, based on the FD-OCC.

The control section 110 may assume that a time domain orthogonal cover code (TD-OCC) having a sequence length of a number (for example, N) larger than one is applied to a demodulation reference signal (DMRS) mapped to pairs of resource elements (REs) in the number larger than the one with time being non-contiguous.

The transmitting/receiving section 120 may perform transmission processing or reception processing of the demodulation reference signal, based on the TD-OCC.

(User Terminal)

Figure 21:
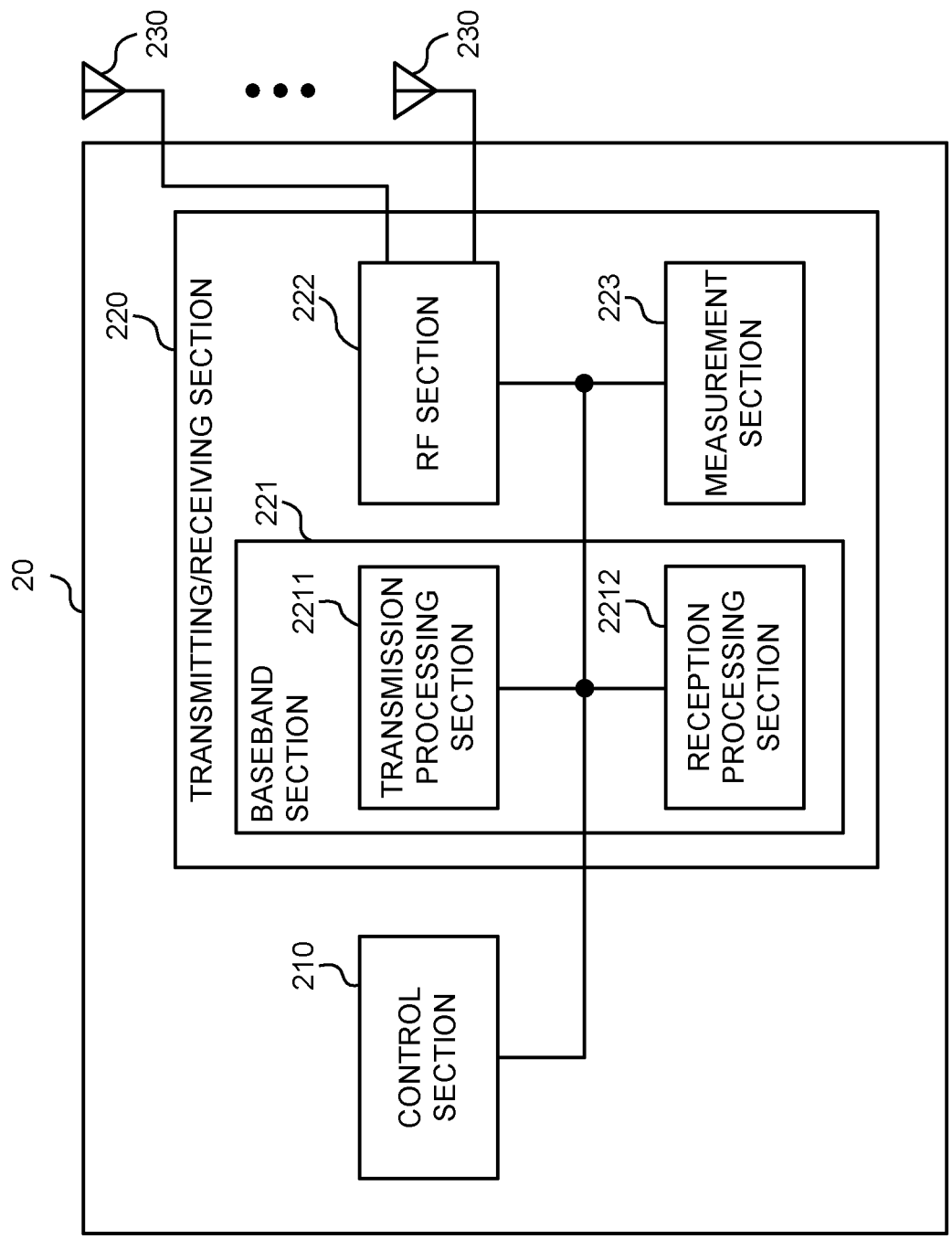
FIG. 21 is a diagram to show an example of a structure of a user terminal according to one embodiment.

FIG. 21 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may assume that a frequency domain orthogonal cover code (FD-OCC) having a sequence length of a number (for example, M) larger than two is applied to a demodulation reference signal (DMRS) mapped to pairs of resource elements (REs) in the number larger than two with different frequencies.

The transmitting/receiving section 220 may perform transmission processing or reception processing of the demodulation reference signal, based on the FD-OCC. The transmitting/receiving section 220 may perform transmission processing or reception processing of the PDSCH/PUSCH, based on the demodulation reference signal.

The control section 210 may assume that the FD-OCC is applied to the demodulation reference signal mapped to the pairs of the resource elements in the number larger than two over a plurality of physical resource blocks.

When a number of the resource elements of the demodulation reference signal in a given bandwidth cannot be divided by a number larger than the 2 without a remainder, the control section 210 may perform control of not transmitting and receiving a part of the demodulation reference signal in the given bandwidth.

The control section 210 may assume that a sequence in which a sequence of the FD-OCC having the sequence length of two is repeated is used as the sequence of the FD-OCC.

The control section 210 may assume that a time domain orthogonal cover code (TD-OCC) having a sequence length of a number (for example, N) larger than one is applied to a demodulation reference signal (DMRS) mapped to pairs of resource elements (REs) in the number larger than the one with time being non-contiguous.

The transmitting/receiving section 220 may perform transmission processing or reception processing of the demodulation reference signal, based on the TD-OCC. The transmitting/receiving section 220 may perform transmission processing or reception processing of the PDSCH/PUSCH, based on the demodulation reference signal.

The control section 210 may assume that the TD-OCC is applied to the demodulation reference signal (in other words, a DMRS in which an additional DMRS is configured) including both of a front-loaded demodulation reference signal (front-loaded DMRS) and an additional demodulation reference signal (additional DMRS).

A part or all of resources of the demodulation reference signal may correspond to a zero power channel state information reference signal (ZP-CSI-RS) for another terminal.

The control section 210 may assume that a sequence in which a sequence of the TD-OCC having the sequence length of two is repeated is used as the sequence of the TD-OCC.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 22:
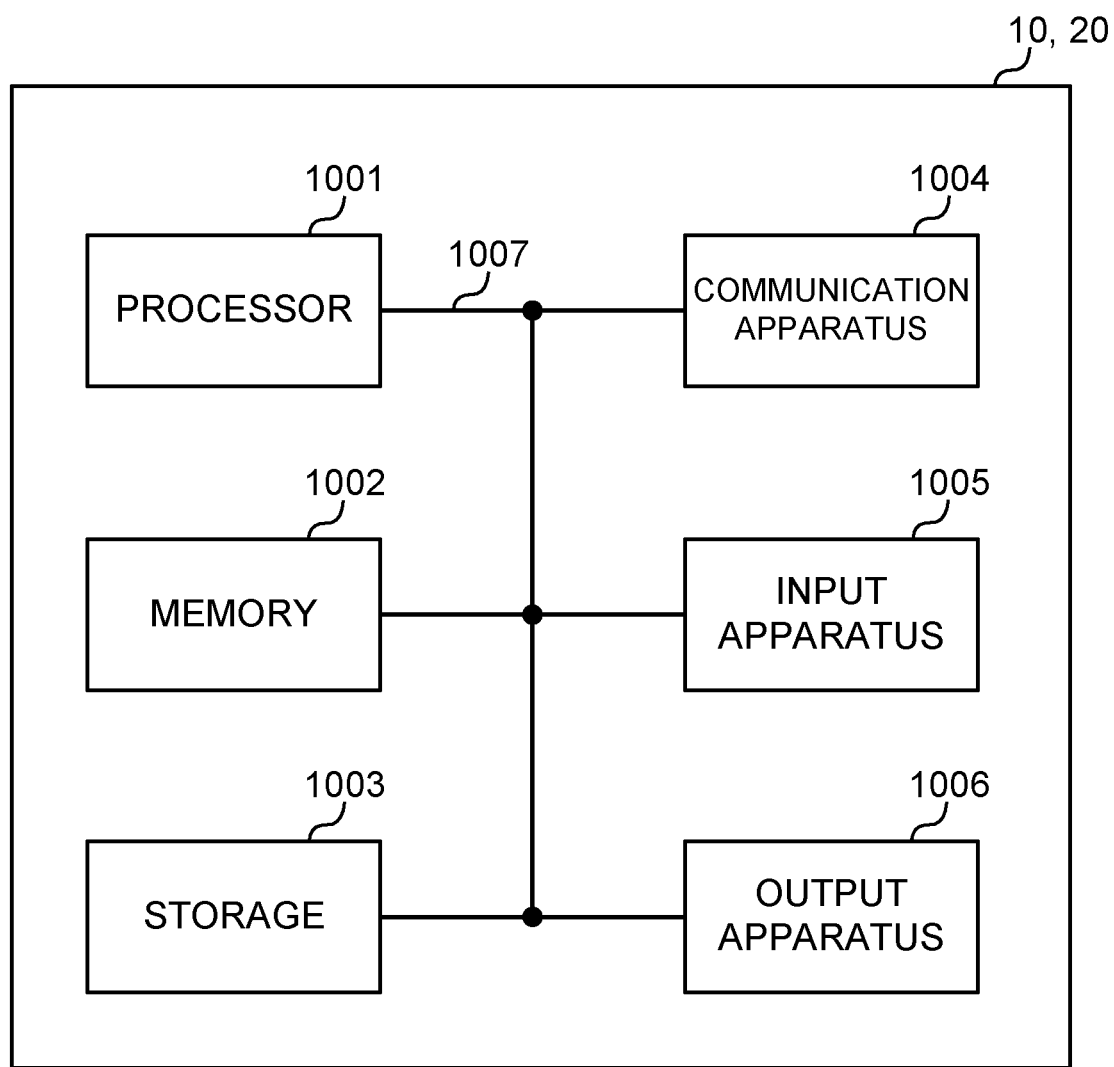
FIG. 22 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 22 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots.

A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that,
    if receiving configuration information of a demodulation reference signal (DMRS) having a greater number of configurable ports than a given number, applies a frequency domain orthogonal cover code (FD-OCC) having a sequence length of a number greater than two to a first DMRS, the first DMRS being mapped to first resource elements having mutually different frequencies, a number of the first resource elements being the number greater than two, and
    if not receiving the configuration information, applies an FD-OCC having a sequence length of two to a second DMRS, the second DMRS being mapped to second resource elements having mutually different frequencies, a number of the second resource elements being the number greater than two; and
a transmitter that transmits the first DMRS or the second DMRS.

2. The terminal according to claim 1, wherein if receiving the configuration information, the processor applies the FD-OCC having the sequence length of the number greater than two to the first DMRS that is mapped to the first resource elements across a plurality of physical resource blocks.

3. The terminal according to claim 1, wherein if receiving the configuration information, the processor maps the first DMRS to a subcarrier k,
    wherein when the first DMRS corresponds to DMRS configuration type 1, $k=8n+2k'+\Delta$ ($n=0, 1, \ldots$; $k'=0, 1, 2, 3$), and
    when the first DMRS corresponds to DMRS configuration type 2, $k=12n+k'+\Delta$ ($n=0, 1, \ldots$; $k'=0, 1$) or $k=12n+k'+\Delta+4$ ($n=0, 1, \ldots$; $k'=2, 3$).

4. The terminal according to claim 1, wherein a sequence of the FD-OCC having the sequence length of the number greater than two is any one of $\{+1, +1, +1, +1\}$, $\{+1, -1, +1, -1\}$, $\{+1, +j, -1, -j\}$, and $\{+1, -j, -1, +j\}$.

5. The terminal according to claim 2, wherein if receiving the configuration information, the processor maps the first DMRS to a subcarrier k,
    wherein when the first DMRS corresponds to DMRS configuration type 1, $k=8n+2k'+\Delta$ ($n=0, 1, \ldots$; $k'=0, 1, 2, 3$), and
    when the first DMRS corresponds to DMRS configuration type 2, $k=12n+k'+\Delta$ ($n=0, 1, \ldots$; $k'=0, 1$) or $k=12n+k'+\Delta+4$ ($n=0, 1, \ldots$; $k'=2, 3$).

6. The terminal according to claim 2, wherein a sequence of the FD-OCC having the sequence length of the number greater than two is any one of $\{+1, +1, +1, +1\}$, $\{+1, -1, +1, -1\}$, $\{+1, +j, -1, -j\}$, and $\{+1, -j, -1, -Fj\}$.

7. The terminal according to claim 3, wherein a sequence of the FD-OCC having the sequence length of the number greater than two is any one of $\{+1, +1, +1, +1\}$, $\{+1, -1, +1, -1\}$, $\{+1, +j, -1, -j\}$, and $\{+1, -j, -1, -Fj\}$.

8. A radio communication method for a terminal, comprising:
    in response to configuration information of a demodulation reference signal (DMRS) having a greater number of configurable ports than a given number being received, applying a frequency domain orthogonal cover code (FD-OCC) having a sequence length of a number greater than two to a first DMRS, the first DMRS being mapped to first resource elements having mutually different frequencies, a number of the first resource elements being the number greater than two, and
    in response to the configuration information being not received, applying an FD-OCC having a sequence length of two to a second DMRS, the second DMRS being mapped to second resource elements having mutually different frequencies, a number of the second resource elements being the number greater than two; and
    transmitting the first DMRS or the second DMRS.

9. A base station comprising:
a receiver that,
    if configuration information of a demodulation reference signal (DMRS) having a greater number of configurable ports than a given number is transmitted to a terminal, receives a first DMRS that is:

mapped to first resource elements having mutually different frequencies, a number of the first resource elements being a number greater than two, and transmitted upon a frequency domain orthogonal cover code (FD-OCC) having a sequence length of the number greater than two being applied to the first DMRS, and if the configuration information is not transmitted to the terminal, receives a second DMRS that is:

mapped to second resource elements having mutually different frequencies, a number of the second resource elements being the number greater than two, and transmitted upon an FD-OCC having a sequence length of two being applied to the second DMRS; and a processor that controls a reception process of the first DMRS or the second DMRS.

10. A system comprising a terminal and a base station, wherein the terminal comprises:
a processor that,
if receiving configuration information of a demodulation reference signal (DMRS) having a greater number of configurable ports than a given number, applies a frequency domain orthogonal cover code (FD-OCC) having a sequence length of a number greater than two to a first DMRS, the first DMRS being mapped to first resource elements having mutually different frequencies, a number of the first resource elements being the number greater than two, and
if not receiving the configuration information, applies an FD-OCC having a sequence length of two to a second DMRS, the second DMRS being mapped to second resource elements having mutually different frequencies, a number of the second resource elements being the number greater than two; and
a transmitter that transmits the first DMRS or the second DMRS, and
the base station comprises:
a receiver that receives the first DMRS or the second DMRS.

* * * * *